(12) United States Patent
Murase et al.

(10) Patent No.: US 9,751,961 B2
(45) Date of Patent: Sep. 5, 2017

(54) CATALYST COMPONENT FOR OLEFIN POLYMERIZATION, CATALYST FOR OLEFIN POLYMERIZATION, AND PROCESS FOR PRODUCING OLEFIN (CO)POLYMER USING THE SAME

(71) Applicant: JAPAN POLYPROPYLENE CORPORATION, Tokyo (JP)

(72) Inventors: Miyuki Murase, Mie (JP); Takehiro Sagae, Mie (JP); Masahide Murata, Mie (JP)

(73) Assignee: JAPAN POLYPROPYLENE CORPORATION, Tokyo (JP)

(*) Notice: Subject to any disclaimer, the term of this patent is extended or adjusted under 35 U.S.C. 154(b) by 0 days.

(21) Appl. No.: 15/030,453

(22) PCT Filed: Oct. 24, 2014

(86) PCT No.: PCT/JP2014/078323
§ 371 (c)(1),
(2) Date: Apr. 19, 2016

(87) PCT Pub. No.: WO2015/060421
PCT Pub. Date: Apr. 30, 2015

(65) Prior Publication Data
US 2016/0272736 A1    Sep. 22, 2016

(30) Foreign Application Priority Data
Oct. 25, 2013  (JP) .................. 2013-221842

(51) Int. Cl.
C08F 4/02 (2006.01)
C08F 4/6592 (2006.01)
C08F 10/06 (2006.01)
C08F 4/659 (2006.01)

(52) U.S. Cl.
CPC .............. *C08F 10/06* (2013.01); *C08F 4/02* (2013.01); *C08F 4/025* (2013.01); *C08F 4/65912* (2013.01); *C08F 4/65927* (2013.01)

(58) Field of Classification Search
CPC ...... C08F 4/02; C08F 4/025; C08F 4/659012; C08F 4/65916; C08F 10/00
See application file for complete search history.

(56) References Cited

U.S. PATENT DOCUMENTS

| | | | |
|---|---|---|---|
| 5,308,811 A | 5/1994 | Suga et al. | |
| 5,928,982 A | 7/1999 | Suga et al. | |
| 2003/0027950 A1 | 2/2003 | Uchino et al. | |
| 2015/0119540 A1* | 4/2015 | Holtcamp | C08F 4/02 526/130 |

FOREIGN PATENT DOCUMENTS

| | | |
|---|---|---|
| CN | 1394209 A | 1/2003 |
| JP | H05-301917 A | 11/1993 |
| JP | H07-309907 A | 11/1995 |
| JP | H08-127613 A | 5/1996 |
| JP | 10-168109 A | 6/1998 |
| JP | 2001-163909 A | 6/2001 |
| JP | 2002-037812 A | 2/2002 |
| JP | 2002-88114 A | 3/2002 |
| JP | 2002-371108 A | 12/2002 |
| JP | 2003-105015 A | 4/2003 |
| JP | 2003-252924 A | 9/2003 |
| JP | 2012-206910 A | 10/2012 |
| JP | 2012-214745 A | 11/2012 |

OTHER PUBLICATIONS

International Search Report issued with respect to application No. PCT/JP2014/078323, dated Jan. 27, 2015.
International Preliminary Report on Patentability issued with respect to application No. PCT/JP2014/078323, dated Apr. 26, 2016.
European Search Report issued with respect to Application No. 14856212.7, dated Oct. 28, 2016.
Chinese Office Action issued with respect to Application No. 201480058710.8, dated Jan. 26, 2017.

* cited by examiner

*Primary Examiner* — Caixia Lu
(74) *Attorney, Agent, or Firm* — Greenblum & Bernstein, P.L.C.

(57) ABSTRACT

Provided are a catalyst component for olefin polymerization which is highly active, an olefin polymerization catalyst, and a process for producing an olefin (co)polymer using the catalyst. The catalyst component for olefin polymerization is characterized by comprising an ion-exchanged phyllosilicate having the property 1 and preferably further having the property 2, etc.

10 Claims, 3 Drawing Sheets

[Fig. 1]
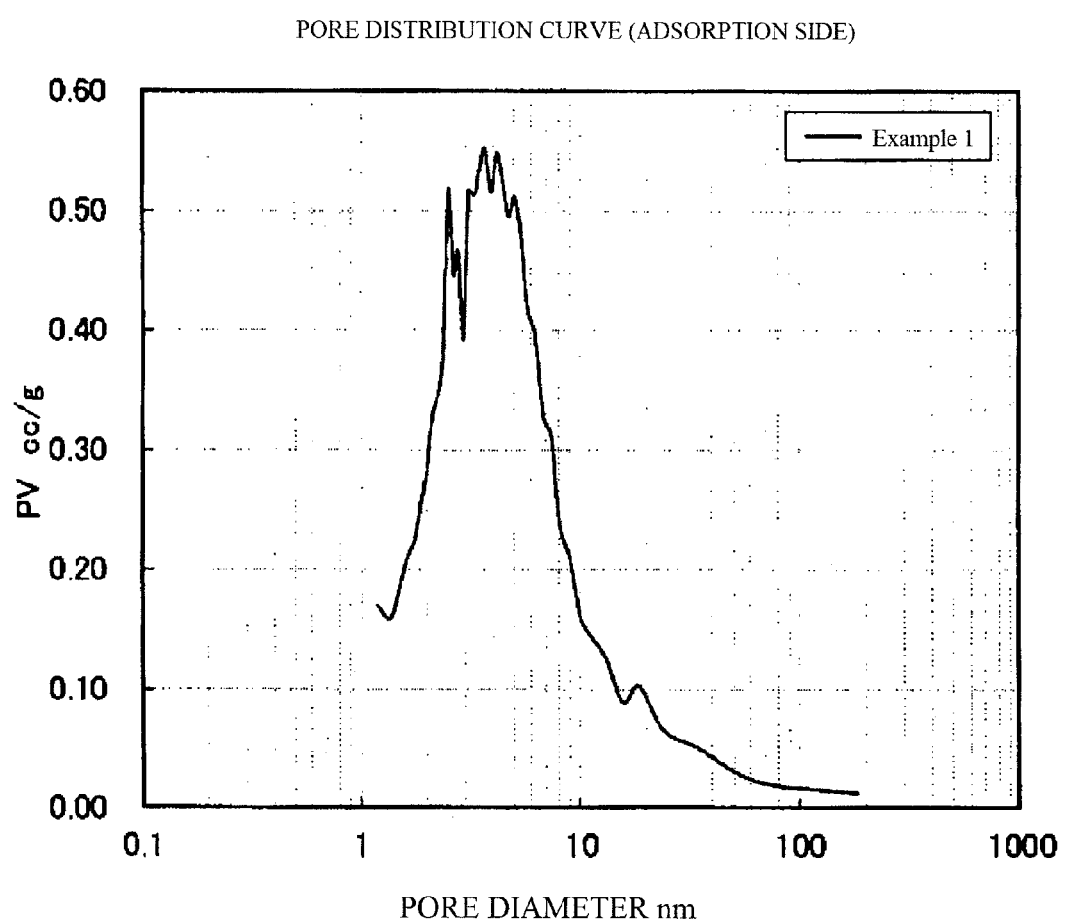

[Fig. 2]
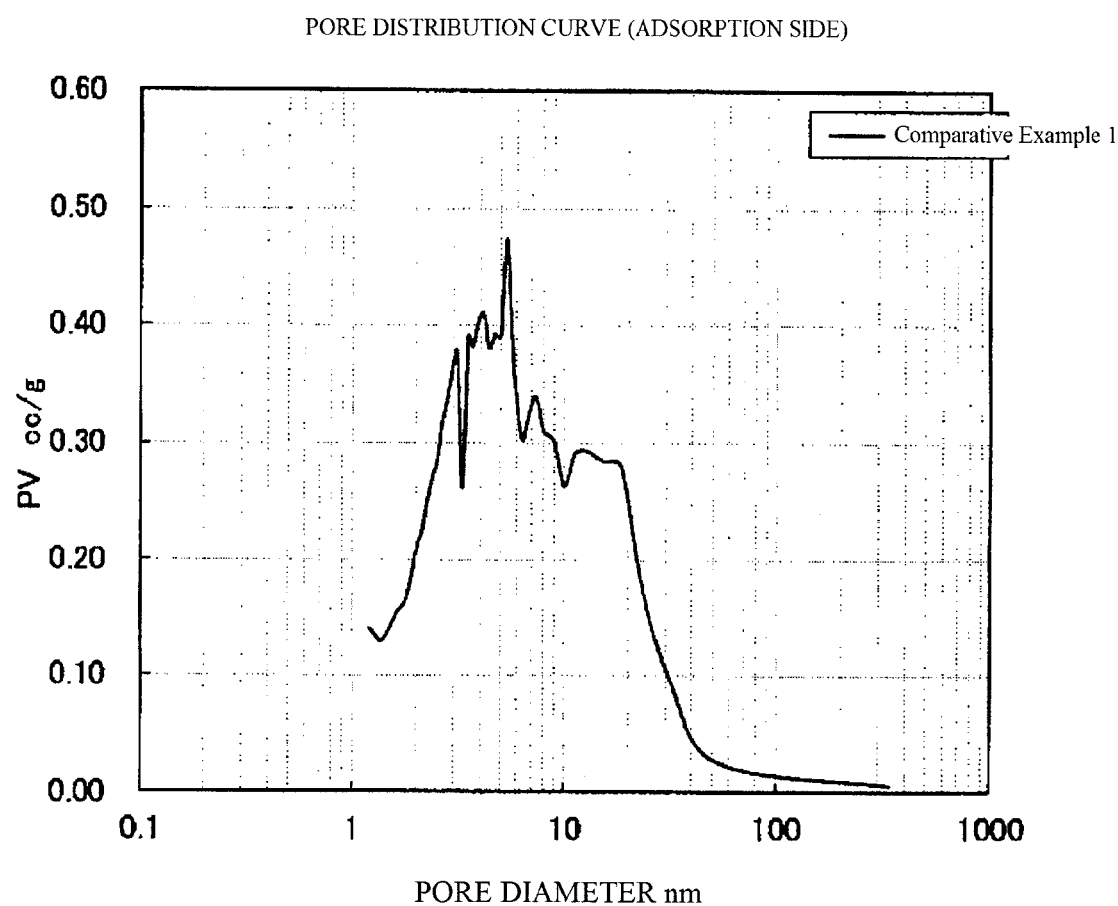

[Fig. 3]
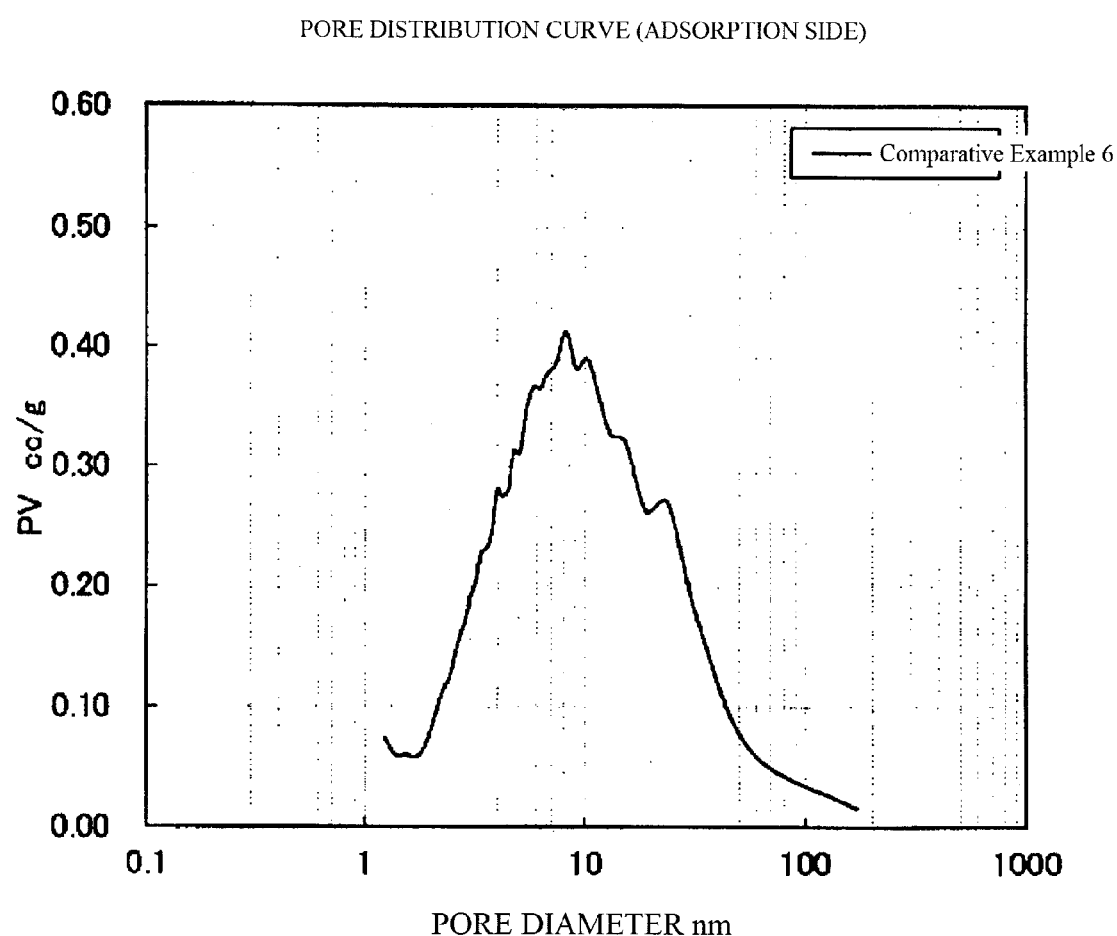

CATALYST COMPONENT FOR OLEFIN POLYMERIZATION, CATALYST FOR OLEFIN POLYMERIZATION, AND PROCESS FOR PRODUCING OLEFIN (CO)POLYMER USING THE SAME

TECHNICAL FIELD

The present invention relates to a catalyst component for olefin polymerization, a catalyst for olefin polymerization, and a process for producing an olefin (co)polymer using the catalyst. More particularly, the invention relates to a catalyst component for olefin polymerization which includes an ion-exchanged phyllosilicate having a specific structure, a catalyst for olefin polymerization, and a process for producing an olefin (co)polymer using the catalyst.

BACKGROUND ART

Catalysts for olefin polymerization are known in which a clay, clay mineral, or ion-exchange lamellar compound is utilized as a catalyst component (see, for example, patent document 1). In the technical field of olefin polymerization catalysts in which a clay, clay mineral, or ion-exchange lamellar compound is used as a catalyst component, there has been a problem concerning improvements in catalytic activity and various means for solving the problem have been proposed (see, for example, patent documents 2 to 4). For example, a catalyst for olefin polymerization is known in which a clay, clay mineral, or ion-exchange lamellar compound that has undergone an acid treatment, a salt treatment, or a chemical treatment performed in the presence of both an acid and a salt is included as a catalyst component.

Also known is a method wherein an ion-exchanged phyllosilicate which has been treated with a high-concentration acid, in order to modify the pore structure thereof, is used as a catalyst component for olefin polymerization (see, for example, patent document 5). According to this method, by treating an ion-exchanged phyllosilicate with a high-concentration acid, pores having a large size can be formed. By using the thus-treated ion-exchanged phyllosilicate as a catalyst component, polymers having improved particle properties are obtained and an improvement in catalytic activity is attained.

Other techniques in which an ion-exchanged phyllosilicate having a specific structure is used are known (see, for example, patent documents 6 to 8).

Furthermore disclosed as techniques in which attention is directed to a specific structure of an ion-exchanged phyllosilicate are one in which the amount of micropores in an ion-exchanged phyllosilicate has been specified and one in which an ion-exchanged phyllosilicate is chemically treated with an inorganic acid to eliminate metal atoms therefrom at a specified rate (see patent documents 9 and 10).

These techniques relate to a highly active ion-exchanged phyllosilicate obtained by chemically treating an ion-exchanged phyllosilicate while controlling the swelling action, which is one of the features thereof, to thereby enlarge the treatment surfaces and increase the amount of micropores having a small diameter.

However, the catalyst components for olefin polymerization according to those techniques proposed so far are still insufficient in activity, and a further technological improvement is desired.

PRIOR-ART DOCUMENTS

Patent Documents

Patent Document 1: JP-A-5-301917
Patent Document 2: JP-A-7-309907
Patent Document 3: JP-A-8-127613
Patent Document 4: JP-A-10-168109
Patent Document 5: JP-A-2002-037812
Patent Document 6: JP-A-2002-088114
Patent Document 7: JP-A-2003-105015
Patent Document 8: JP-A-2003-252924
Patent Document 9: JP-A-2012-214745
Patent Document 10: JP-A-2012-206910

SUMMARY OF THE INVENTION

Problem that the Invention is to Solve

An object of the invention, in view of the circumstances and problem of the prior-art techniques, is to provide a highly active catalyst component for olefin polymerization, an olefin polymerization catalyst, and a process for producing an olefin (co)polymer using the catalyst.

Means for Solving the Problem

There are still many unclear points concerning the pore structure of an ion-exchanged phyllosilicate and concerning the performance of the phyllosilicate as a catalyst component for olefin polymerization, and there have been room for investigations to be made on the pore structure of an ion-exchanged phyllosilicate in order to obtain a more active catalyst component for polymerization.

The present inventors hence diligently made investigations in order to accomplish the object. As a result, the inventors have discovered that in cases when an ion-exchanged phyllosilicate having a specific structure is used as a catalyst component for olefin polymerization, the catalytic activity improves remarkably. More specifically, the present inventors have discovered that in cases when an ion-exchanged phyllosilicate in which the amount of specific micropores accounts for 60-100% of the overall pore amount is used as a catalyst component for olefin polymerization, the catalytic activity improves remarkably. The present invention has been completed on the basis of that discovery.

According to a first invention of the present invention, a catalyst component for olefin polymerization is provided, the catalyst component being characterized by comprising an ion-exchanged phyllosilicate having the following property 1.

Property 1: in a pore distribution curve calculated by the BJH analysis method using an adsorption isotherm determined by a nitrogen adsorption method, the sum of the volumes of pores each having a diameter of 2-10 nm accounts for 60-100% of the total volume of mesopores.

According to a second invention of the present invention, the catalyst component for olefin polymerization according to the first invention is provided, the catalyst component being characterized in that the ion-exchanged phyllosilicate further has the following property 2.

Property 2: in X-ray diffractometry (XRD), the ion-exchanged phyllosilicate gives a diffraction pattern which has a peak (m) at a 2θ of 19.6-20.0 degrees, and when the peak (m) has a peak intensity (M), there is no peak (i) other than the peak (m) in a 2θ of 15-25 degrees or there is a peak (i) in the 2θ of 15-25 degrees and the peak (i) has a peak intensity (I) that satisfies the relationship with the peak intensity (M): 0<(I/M)≤1.6, with the proviso that there may be multiple peaks (i) and in a case where there are multiple (n) peaks (i), the sum of the ratios of the peak intensity ($I_n$) of the respective n peaks to the peak intensity (M), $I_n/M$, satisfies 0<[sum of ($I_n/M$)]≤1.6.

According to a third invention of the present invention, the catalyst component for olefin polymerization according to the first or the second invention is provided, the catalyst component being characterized in that the ion-exchanged phyllosilicate further has the following property 3, Property 3: a specific surface area is 325 m²/g or larger.

According to a fourth invention of the present invention, the catalyst component for olefin polymerization according to any one of the first to the third inventions is provided, the catalyst component being characterized in that the ion-exchanged phyllosilicate is a silicate belonging to a smectite group.

According to a fifth invention of the present invention, the catalyst component for olefin polymerization according to the first to the fourth inventions is provided, the catalyst component being characterized in that the ion-exchanged phyllosilicate is montmorillonite.

According to a sixth invention of the present invention, the catalyst component for olefin polymerization according to the first to the fifth inventions is provided, the catalyst component being characterized in that the ion-exchanged phyllosilicate has undergone an acid treatment with an inorganic acid or an organic acid, and 10-65% by mole of main metal cations of the octahedral sheets constituting the ion-exchanged phyllosilicate have been eliminated by the acid treatment.

According to a seventh invention of the present invention, the catalyst component for olefin polymerization according to the sixth invention is provided, the catalyst component being characterized in that the main metal cations of the octahedral sheets are aluminum.

According to a eighth invention of the present invention, a catalyst for olefin polymerization is provided, the catalyst comprising the following component (a) and component (b), and optionally comprising the following component (c), Component (a): a metallocene compound of a transition metal belonging to Group 4 of the periodic table, Component (b): the catalyst component for olefin polymerization according to any one of the first to the seventh inventions, and Component (c): an organoaluminum compound.

According to a ninth invention of the present invention, a process for producing an olefin (co)polymer is provided, the process comprising polymerizing or copolymerizing one or more kinds of olefins using the catalyst for olefin polymerization according to the eighth invention.

Effect of the Invention

The catalyst component for olefin polymerization of the invention includes an ion-exchanged phyllosilicate having a large number of pores having a size sufficient for the diffusion of a cation species that is a precursor for active sites and is yielded from a transition metal compound, and having undergone an even chemical treatment. By using this catalyst component for olefin polymerization, an increase in the number of active sites is attained and an olefin (co) polymer can be produced with high activity.

BRIEF DESCRIPTION OF THE DRAWINGS

FIG. 1 is a chart which shows a pore distribution curve for an ion-exchanged phyllosilicate (Example 1) as a catalyst component for olefin polymerization of the invention.

FIG. 2 is a chart which shows a pore distribution curve for the ion-exchanged phyllosilicate of Comparative Example 1.

FIG. 3 is a chart which shows a pore distribution curve for the ion-exchanged phyllosilicate of Comparative Example 6.

MODES FOR CARRYING OUT THE INVENTION

The present invention is explained below in detail.
1. Catalyst Component for Olefin Polymerization
(1) Property 1 of the Ion-Exchanged Phyllosilicate An ion-exchanged phyllosilicate having the following property 1 is used as or in the catalyst component for olefin polymerization of the invention.

Property 1: in a pore distribution curve calculated by the BJH analysis method using an adsorption isotherm determined by a nitrogen adsorption method, the sum of the volumes of pores each having a diameter of 2-10 nm accounts for 60-100% of the total volume of mesopores.

A method for determining pore diameter and pore volume by a nitrogen adsorption method is shown below.

With respect to the amount of a gas which is adsorbed onto a solid, the potential of adsorptive interaction can be thought to be substantially constant when the temperature is constant and the solid and the gas have been fixed. Consequently, the adsorption amount is expressed as a function of pressure alone, and this relationship is generally called an adsorption isotherm.

In the invention, nitrogen gas, which is the most common gas for use in evaluating pore distributions, is used as an adsorbate gas, and the phyllosilicate was examined at the liquid-nitrogen temperature (temperature, 77 K) and at relative pressures P/P0 (P0 indicates atmospheric pressure) in the range of 0.025-0.995 to determine an adsorption isotherm.

For calculating the volume of pores having a size within the range specified in the invention, use is made of an adsorption isotherm obtained when the relative pressure is elevated. The BJH analysis method is the most common as a method for calculating pore distributions, and this method is employed in the invention. Graphs showing pore distribution curves obtained by the BJH method are shown in relation to an Example and Comparative Examples which will be described later (FIGS. 1 to 3).

In the invention, the term "mesopores" means pores each having a diameter of 2-50 nm, in accordance with the definition by IUPAC. Using each pore distribution curve, the sum of the volumes of pores was determined with respect to pores having a diameter of 2-10 nm and pores having a diameter of 2-50 nm.

The ion-exchanged phyllosilicate of the invention is characterized in that in a pore distribution curve calculated by the BJH analysis method using an adsorption isotherm determined by the nitrogen adsorption method, the sum (cc/g) of the volumes of pores having a diameter in the range of 2-10 nm accounts for 60-100% of the sum of the volumes of pores having a diameter in the range of 2-50 nm, i.e., mesopores, (total volume of mesopores) (cc/g).

The sizes of 2-10 nm in terms of diameter are thought to correspond to the edges of the ion-exchanged phyllosilicate. The feature wherein the volume of pores having a size in that range accounts for 60-100% of the total volume of mesopores indicates that the edge parts have been more evenly treated, in the case where a chemical treatment has been performed, as compared with known ion-exchanged phyllosilicates. Furthermore, it is thought that in this ion-exchanged phyllosilicate, such edge parts have portions which can provide active sites (acid sites) for olefin polymerization.

Consequently, an ion-exchanged phyllosilicate having such a structure can be an olefin polymerization catalyst component having higher activity than known ion-exchanged phyllosilicates in which the proportion of micropores is low.

The ion-exchanged phyllosilicate having such a special pore structure may be obtained from a raw-material ion-exchanged phyllosilicate which, when subjected to a chemical treatment that involves metal atom elution therefrom, undergoes more even metal elution from each of the layers constituting the silicate. Alternatively, the desired ion-exchanged phyllosilicate can be attained by using the raw material.

In the ion-exchanged phyllosilicate of the invention, the proportion of the sum of the volumes of pores having a diameter of 2-10 nm determined by the nitrogen adsorption method to the sum of the volumes of mesopores is 60-100%, preferably 61-95%, more preferably 62-90%, even more preferably 63-87%, most preferably 63-85%.

In case where the proportion of the sum of the volumes of pores having a diameter of 2-10 nm to the total volume of mesopores is less than 60%, the activity is thought to be lower. Meanwhile, in cases when the particles have micropores as the only pores, these particles have a higher particle strength since there are a larger number of points of contact between the clay particles than in the case where large pores are present to some degree. It is desirable that ion-exchanged phyllosilicate particles should gradually disintegrate with the progress of polymer formation in olefin polymerization, thereby showing high activity to cause the polymerization to proceed, and should disperse evenly in the polymer. However, high-strength particles are less apt to disintegrate, and hence show reduced activity and come to be unevenly present in the polymer. Consequently, use of high-strength particles may yield a polymer which has impaired powder properties or arouses troubles in processing and molding steps.

It is therefore most desirable that the proportion of the sum of the volumes of pores having a diameter of 2-10 nm to the total volume of mesopores should be 85% or less.

(2) Property 2 of the Ion-Exchanged Phyllosilicate

It is preferable that the ion-exchanged phyllosilicate to be used as or in the catalyst component for olefin polymerization of the invention should have the following property 2 besides the property 1.

Property 2: in X-ray diffractometry (XRD), the ion-exchanged phyllosilicate gives a diffraction pattern which has a peak (m) at a 2θ of 19.6-20.0 degrees, the peak (m) having a peak intensity (M), and in which there is no peak (i) other than the peak (m) in the 2θ range of 15-25 degrees or there is a peak (i) in the 2θ range of 15-25 degrees, the peak (i) having a peak intensity (1) that satisfies the relationship 0<(I/M)≤1.6 with the peak intensity (M), with the proviso that there may be multiple peaks (i) in said 2θ range and in the case where there are multiple (n) peaks (i), the sum of the ratios of the peak intensities ($I_n$) of the respective n peaks to the peak intensity (M), $I_n$/M, satisfies 0<[sum of ($I_n$/M)]≤1.6.

Property 2 indicates the degree to which impurities are contained in the ion-exchanged phyllosilicate of the invention.

In XRD, the peak (m) appearing in the 2θ range of 19.6-20.0 degrees indicates the presence of a component of the ion-exchanged phyllosilicate which is necessary for the silicate to exhibit the performance of an olefin polymerization catalyst. Examples of the component include micas, vermiculites, and smectites. Preferred of these are micas and smectites. Especially preferred are smectites. Of the smectites, montmorillonite and beidellite are preferred, and montmorillonite is especially preferred.

The peak (m) indicates the crystal plane (020) and/or crystal plane (110) of an ion-exchanged phyllosilicate of a kind belonging to those minerals.

Meanwhile, any peak (i) other than the peak (m) (excluding the peak (m)) in the 2θ range of 15-25 degrees is thought to indicate a component which is not a component of the ion-exchanged phyllosilicate which is necessary for the silicate to exhibit the performance of an olefin polymerization catalyst. Namely, the peak (i) is thought to indicate the presence of a component contained as a so-called impurity. The inventors hence discovered that in cases when the peak (i) is absent or when the peak (i) is present and the ratio between the intensity (I) of this peak (i) and the intensity (M) of the peak (m), I/M, satisfies the relationship 0<(I/M)≤0.6, then high performance can be maintained.

In the case where the peak (i) is absent, the intensity ratio (I/M) between the peak (i) and the peak (m) is 0. There are cases where only one peak (i) is present or where multiple peaks (i) are present. In the case where only one peak (i) is present, the intensity ratio (I/M) is the value of (I/M) determined with respect to the peak. In the case of multiple peaks (i), the ratios ($I_n$/M) between the intensities ($I_n$) of the respective peaks (i)n and the intensity (M) of the peak (m) are determined and summed up. For example, in the case where there are three peaks, the peak intensity ratio (I/M) is as follows.

In the case where the peaks respectively have intensities ($I_1$), ($I_2$), and ($I_3$), a numeral represented by (I/M) can be determined using the following mathematical expression.

$$\{(I_1/M)+(I_2/M)+(I_3/M)\}$$

A desirable lower limit of the intensity ratio (I/M) is 0. The lower limit thereof is preferably 0.001, more preferably 0.01, even more preferably 0.05, especially preferably 0.1, most preferably 0.5. Meanwhile, a desirable upper limit of the intensity ratio (I/M) is 1.6, and the upper limit thereof is preferably 1.4, more preferably 1.2, even more preferably 1.0, especially preferably 0.95, most preferably 0.9.

Next, a method of XRD measurement for determining the ratio and a method for determining peak intensities from the results of the measurement are explained.

An XRD measurement was made using a Cu-Kα line (obtained using a Kβ absorbing plate) as an X-ray source under the conditions of a tube voltage of 40 kV and a tube current of 30 mA. A focusing optical system was used. Other conditions included a divergence slit of ⅔ degrees, scattering slit of ⅔ degrees, receiving slit of 0.300 mm, scan mode of 2θ/θ scan, 2θ scan range of 3.0000-55.0000 degrees, angle step interval of 0.0200 degrees, and scanning rate of 4.0000 degrees/min. A scintillation counter was used as a detector, and a holder made of glass and having a depth of 0.2 mm was used as a sample holder. X-ray Diffractometer Smartlab, manufactured by Rigaku Corp., was used as the apparatus.

A procedure for determining peak intensities from the results of measurement thus obtained is explained below.

An X-ray diffraction intensity is obtained in terms of the count in relation to 2θ indicated by the scintillation counter. A base line for diffraction intensity is determined in the following manner. With respect to each of 2θ values of 15 degrees and 25 degrees, an average intensity for the peripheral range of ±0.10 (an average for 11 points since the angle step is 0.02 degrees) is determined. These average values are taken respectively as the intensities at 2θ's of 15 degrees and 25 degrees. A straight line is drawn so as to connect these two points, and this straight line is taken as the base line.

If any diffraction peak assignable to the sample has appeared in the 2θ range of 15±0.1 degrees or 25±0.1 degrees, a peak-free 2θ position is selected in a peripheral several-degree area so as to avoid that peak, and an intensity for base line is determined with respect to this 2θ position. Incidentally, for assessing whether a peak is present or not, use is made of a method in which the measured diffraction intensities are plotted against 2θ in the range of 14-26 degrees, and a peak search by the local maximum method in which the number of points is 2θ is applied thereto.

Diffraction intensities from which the base line has been subtracted are plotted against 2θ in the range of 15-25 degrees, and the plot is subjected to a peak search by the local maximum method in which the number of points is 20 and the threshold value is 20% (any maximum having an intensity less than 20% of the highest intensity value is not regarded as a peak).

The intensity of a peak in the 2θ range of 19.6-20.0 degrees obtained by the search is taken as the intensity (M) of the peak (m), and all of peaks in the 2θ range of 15-25° other than the peak (m) are taken as peaks (i) and the intensity thereof is taken as the intensity (I) of the peaks (i).

Examples of the peaks present in the 2θ range of 15-25 degrees include the following.

Examples thereof include illite (2θ=16-17 degrees), chrysotile (2θ=19.1-19.5 degrees), talc (2θ=19.3-19.5 degrees), dicakaite (2θ=18-19 degrees), nacrite (2θ=18-19 degrees), chlorite (2θ=18-19 degrees), halloysite (2θ=20.0-20.5 degrees), quartz (2θ=20.6-21.0 degrees), cristobalite (2θ=21.6-22 degrees), calcite (2θ=22.8-23.3 degrees), and kaolinite (2θ=24.7-25 degrees).

(3) Property 3 of the Ion-Exchanged Phyllosilicate

It is more preferable that the ion-exchanged phyllosilicate according to the invention should have property 3, i.e., to have a specific surface area of 325 m²/g or larger, besides property 1 or besides property 1 and property 2.

The specific surface area indicates a spatial extent necessary for an active-site precursor to be supported by the ion-exchanged phyllosilicate and become active sites to cause polymerization reactions to proceed. Larger specific surface areas are preferred. In cases when the ion-exchanged phyllosilicate has a large specific surface area, an active-site precursor is supported thereon in a sufficient amount and reaction surfaces for causing polymerization reactions to proceed thereon can be sufficiently ensured, resulting in a further improvement in activity. Meanwhile, in case where the specific surface area thereof is too large, there is a possibility that the particles might be so brittle that the shape thereof cannot be maintained, resulting in impaired powder properties. In addition, there is a possibility that the catalyst might be crushed or disintegrated during polymerization to cause the occurrence of fine particles or agglomerates, leading to a decrease in the stability of plant operation.

A lower limit of the specific surface area thereof is desirably 150 m²/g, preferably 200 m²/g, more preferably 280 m²/g, even more preferably 325 m²/g, especially preferably 330 m²/g, most preferably 350 m²/g. Meanwhile, there is no particular upper limit on the specific surface area thereof. However, an upper limit thereof is preferably 600 m²/g, more preferably 580 m²/g, even more preferably 550 m²/g, especially preferably 500 m²/g.

Examples of upper and lower limits of the specific surface area thereof include ranges defined by any desirable combinations of any of the desirable lower limits with any of the desirable upper limits. For example, such ranges are 325-550 m²/g, 330-500 m²/g, 350-500 m²/g, 200-600 m²/g, 350-580 m²/g, 280-550 m²/g, and 325-550 m²/g.

Naturally occurring ion-exchanged phyllosilicates have a relatively small specific surface area of about 0.1-140 m²/g, preferably about 0.1-90 m²/g. However, the specific surface area thereof can be increased by the chemical treatment which will be described later.

Specific surface area was determined by subjecting an adsorption isotherm obtained in the manner described above to BET multipoint analysis. In general, analysis is made with respect to a range which corresponds to relative pressures P/P0 (P0 is the atmospheric pressure) of around 0.05-0.35 and in which a satisfactory straight line is obtained. Such an analysis range was determined while examining the BET plot.

(4) Property 4 of the Ion-Exchanged Phyllosilicate

It is preferable that the ion-exchanged phyllosilicate to be used as or in the catalyst component for olefin polymerization of the invention should further has the following property 4.

It is preferable that the ion-exchanged phyllosilicate to be used in the invention should be an ion-exchanged phyllosilicate which satisfies the following as property 4.

In cases when the contents of Si, Al, Mg, Fe, and Na determined by fluorescent X-ray analysis and the contents of Ca and K determined by ICP emission spectroscopy are used to determine the values of x and y which indicate the proportions in number of atoms (the inferior numerals affixed to element symbols) in the general formula $(M^+, M^{2+}_{1/2})_{x+y}(Y^{3+}_{2-y}, Y^{2+}_{y})(Si_{4-x}Al_x)O_{10}(OH)_2 \cdot nH_2O$, which represents the chemical composition of dioctahedral smectite, to complete the general formula, then it is preferable that the ratio between the amount of the Si component in the formula (Si(s)) and the total Si component amount determined (Si(t)), Si(s)/Si(t), should be 0.50-1.

The general formula representing the chemical composition of dioctahedral smectite is given on the page 65 in *Nendo Handobukku*, 3rd edition (The Clay Science Society of Japan; Gihodo Shuppan Co., Ltd.; published on Apr. 30, 2009). The Si(s) indicates the Si component derived from the dioctahedral smectite component contained in the raw-material ion-exchanged phyllosilicate. Meanwhile, the Si(t) determined by analysis indicates the amount of all the Si components contained in the ion-exchanged phyllosilicate.

In the case where the determined value of Si(s) is not equal to the Si(t), this means that the ion-exchanged phyllosilicate contains an Si component not derived from dioctahedral smectite. It is thought that the dioctahedral smectite affects the performance of the catalyst for olefin polymerization, and the content thereof is thought to be one of the factors which govern the performance.

Consequently, in the ion-exchanged phyllosilicate according to the invention, the relationship in proportion between Si(s) and Si(t) is important, and it is preferable that the proportion of Si(s) should be large. It is preferable that the ratio of Si(s) to Si(t), Si(s)/Si(t), should be 0.50-1.

A desirable lower limit of that range is 0.50, and the lower limit is preferably 0.55, more preferably 0.60, even more preferably 0.65, especially preferably 0.70, most preferably 0.75. Meanwhile, a desirable upper limit of that range is most preferably 1, which indicates the state of including no impurities. However, the upper limit may be 0.98 or 0.95, or may be 0.90. It is preferable that the amount of the Si component derived from dioctahedral smectite, i.e., Si(s), should be large.

How Si(s) is determined form the general formula representing a chemical composition and from the amounts of atoms determined by the methods mentioned above is explained next.

The $M^+$, $M^{2+}$, $Y^{3+}$, and $Y^{2+}$ in the general formula respectively indicate the following atoms. $M^+$ indicates K and Na; $M^{2+}$ indicates Ca; $Y^{3+}$ indicates Al, $Fe^{3+}$, $Mn^{3+}$, and $Cr^{3+}$; and $Y^{2+}$ indicates Mg, $Fe^{2+}$, $Mn^{2+}$, Ni, Zn, and Li (*Nendo Handobukku*, 3rd edition, p. 65, Gihodo Shuppan, published on Apr. 30, 2009).

Of those atoms, the seven atoms mentioned hereinabove, which are generally used for expressing the chemical composition of the dioctahedron, are used as $M^{2+}$, $Y^{3+}$, and $Y^{2+}$. Here, Fe atoms are all dealt with as $Fe^{3+}$. Namely, $M^+$ indicates K and Na, $M^{2+}$ indicates Ca, $Y^{3+}$ indicates Al and $Fe^{3+}$, and $Y^{2+}$ indicates Mg.

First, the proportions in number of atoms (which include x and y here) in the general formula are determined. In the general formula, the amounts of atoms present and the proportions in number of the atoms thereof have a relationship represented by the following expression 1. However, since the Si in the formula is an Si component derived from smectite, the Si is expressed here by Si(s).

[Math. 1]

$$\frac{M^+ + M^{2+}}{x+y} = \frac{Y^{3+}}{2-y} = \frac{Y^{2+}}{y} = \frac{Si(s)}{4-x} = \frac{Al}{x} \qquad \text{expression 1}$$

When K and Na are substituted for the $M^+$, Ca is substituted for the $M^{2+}$, Al and $Fe^{3+}$ are substituted for the $Y^{3+}$, and Mg is substituted for the $Y^{2+}$, then the following expression 2 holds. The amount of each atom present is expressed here in terms of the number of moles per g of the ion-exchanged phyllosilicate (mol/g).

[Math. 2]

$$\frac{Na + K + 1/2Ca}{x+y} = \frac{Al^{3+} + Fe}{2-y} = \frac{Mg}{y} = \frac{Si(s)}{4-x} = \frac{Al}{x} \qquad \text{expression 2}$$

When expression 2 is rearranged and the equation is solved, then the following expression 3 and expression 4 are obtained.

[Math. 3]

$$y = \frac{2Mg}{Al^{3+} + Fe + Al + 2Mg - (Na + K + 1/2Ca)} \qquad \text{expression 3}$$

$$x = \frac{2(Na + K + 1/2Ca - Mg)}{Al^{3+} + Fe + Al + 2Mg - (Na + K + 1/2Ca)} \qquad \text{expression 4}$$

The sum of the $Al^{3+}$ and Al in expression 3 and expression 4 indicates the amount of the Al component which can be determined by the analysis. These expressions each can hence be rewritten as follows.

[Math. 4]

$$y = \frac{2Mg}{Al + Fe + 2Mg - (Na + K + 1/2Ca)} \qquad \text{expression 5}$$

$$x = \frac{2(Na + K + 1/2Ca - Mg)}{Al + Fe + 2Mg - (Na + K + 1/2Ca)} \qquad \text{expression 6}$$

The values of x and y can be determined by introducing into expression 5 and expression 6 the amounts of the atoms which can be determined by the analysis.

Furthermore, the Si(s) component amount to be determined can be determined by rearranging the expression 7 derived from expression 2, thereby obtaining expression 8, substituting the values obtained using expressions 5 and 6 respectively for the x and y in expression 8, and introducing the Mg atom amount which can be determined by the analysis.

[Math. 5]

$$\frac{Mg}{y} = \frac{Si(s)}{4-x} \qquad \text{expression 7}$$

$$Si(s) = \frac{(4-x) * Mg}{y} \qquad \text{expression 8}$$

The Si(s) thus determined is divided by the Si(t) determined by the analysis. Thus, Si(s)/Si(t) can be determined.

The fluorescent X-ray analysis can be conducted, for example, in the following manner.

A specimen is burned at 700° C. for 1 hour. A 0.5-g portion is thereafter taken out therefrom and mixed with 4.5 g of $Li_2B_4O_7$ as a flux and 0.03 g of KBr as a release agent, and glass beads are produced therefrom.

The sample thus prepared is subjected to quantitative analysis with an XRF analyzer (e.g., ZSX-100e, manufactured by Rigaku Industrial Corp.) by the calibration curve method.

Meanwhile, in the ICP emission spectroscopy, sulfuric acid and hydrofluoric acid are added to the specimen which has been burned at 700° C. for 1 hour, and the mixture is heated to dissolve the specimen. Thereafter, this solution is examined with an ICP-OES (e.g., ULTIMA Type 2, manufactured by Horiba Ltd.).

(5) Property 5 of the Ion-Exchanged Phyllosilicate

It is preferable that the ion-exchanged phyllosilicate to be used as or in the catalyst component for olefin polymerization of the invention should further have the following property 5.

It is preferable that the ion-exchanged phyllosilicate according to the invention should have a high degree of isomorphous substitution. For example, in the octahedral sheets of the ion-exchanged phyllosilicate, the molar ratio between the amounts of Mg and Al contained therein, Mg/Al, is desirably 0.28 or higher. The molar ratio thereof is preferably 0.28-3.5, more preferably 0.285-2.5, even more preferably 0.287-1.5, especially preferably 0.29-1, in particular 0.292-0.8, most preferably 0.292-0.5.

In the case where some of the trivalent aluminum has been replaced by divalent magnesium as shown above, this ion-exchanged phyllosilicate has negative layer charges. The present inventors consider that the negative layer charges affect the performance (activity) of the metallocene catalyst by functioning as counter anions for rendering the cation species of a metallocene transition metal compound (complex), which is an active-site precursor for the metallocene catalyst, present stably as active sites. Namely, the inventors consider that the negative layer charges have the effect of heightening the activity.

The Mg/Al molar ratio can be determined from a chemical structural formula. The chemical structural formula is determined from the results obtained by quantifying the atoms contained in the ion-exchanged phyllosilicate by a common method of chemical analysis, such as fluorescent X-ray analysis (XRF), ICP, or absorptiometry.

For the calculation, the method described on pages 272-274 of *Nendo Handobukku* (The Clay Science Society of Japan, Gihodo Shuppan Co., Ltd., published in 2009, 3rd edition) is generally used. By determining a chemical structural formula by the method, the kind of cations in each sheet and the kind of cations which replace the cations by isomorphous substitution are rendered clear.

Among calculation methods is a frequently used method in which the charge number of anions is used as a reference. This calculation method is explained below.

The molecular proportion of each atom determined by chemical analysis is multiplied by the charge number of the cation contained in an oxide of the atom (in the case of Si, for example, the charge number is 4) to determine the number of cations, and the total number of all the cations is determined.

Next, in order to determine a coefficient for balancing the cation charges with the anion charges, the negative charge number in the structure (O contained in the clay mineral), i.e., 22, is divided by the total number of cations.

The coefficient thus obtained is multiplied by the number of cations of each atom obtained above. The proportion of each atom contained in the structure can be calculated thereby, and a structural formula can hence be completed. Thus, the molar ration between the aluminum and magnesium contained in the octahedral sheet, Mg/Al, can be determined.

(6) Property 6 of the Ion-Exchanged Phyllosilicate

It is preferable that the ion-exchanged phyllosilicate according to the invention should have property 6, i.e., to have a sum of the volumes of mesopores (total volume of mesopores), as determined by the nitrogen adsorption method, of 0.30 cc/g or larger. The total volume of mesopores thereof is more preferably 0.35 cc/g or larger, even more preferably 0.40 cc/g or larger, especially preferably 0.45 cc/g or larger. With respect to maximum amount, the total volume of mesopores thereof is preferably 1 cc/g or less, more preferably 0.8 cc/g or less, even more preferably 0.6 cc/g or less.

Meanwhile, the sum of the volumes of pores each having a diameter in the range of 2-10 nm is preferably 0.15 cc/g or larger, more preferably 0.20 cc/g or larger, even more preferably 0.25 cc/g or larger. In case where the volume of such pores is less than that, it is thought that a decrease in activity may result. Meanwhile, with respect to maximum amount, the pore volume is preferably 1 cc/g or less, more preferably 0.8 cc/g or less, even more preferably 0.6 cc/g or less, especially preferably 0.5 cc/g or less. In case where the pore volume is larger than that, it is thought that this ion-exchanged phyllosilicate may cause the occurrence of fine particles or impaired powder properties.

(7) Property 7 of the Ion-Exchanged Phyllosilicate

It is preferable that the ion-exchanged phyllosilicate according to the invention should have property 7, i.e., to have acid sites. A lower limit of the amount of acid sites therein, in terms of the amount of strong-acid sites having a pKa not higher than −8.2 per g of the ion-exchanged phyllosilicate, is preferably 30 µmol, more preferably 50 µmol, even more preferably 100 µmol, especially preferably 150 µmol. The amount of acid sites is determined in accordance with the method described in JP-A-2000-158707.

(8) Preparation of the Ion-Exchanged Phyllosilicate

The ion-exchanged phyllosilicate having the properties described above can be produced by the following method.

Raw materials for the ion-exchanged phyllosilicate to be used in the invention are not limited to natural ones, and may be artificially synthesized ones. Examples of such silicates include the following, which are shown in "Nendo Kobutsu-gaku" (written by Haruo SHIROZU, Asakura Publishing Co., Ltd., 1995).

i) Clay Minerals in which 1:1 layers are main constituent layers, such as kaolin-group minerals including dickite, kaolinite, and nacrite, serpentine-group minerals including chrysotile, lizardite, and antigorite, and serpentine-analogue minerals including amesite and Al-lizardite.

ii) Clay Minerals in which 2:1 layers are main constituent layers, such as smectite-group silicates including montmorillonite, beidellite, nontronite, saponite, hectorite, and stevensite, vermiculite-group silicates including vermiculite, mica-group silicates including mica, illite, sericite, and glauconite, attapulgite, sepiolite, palygorskite, and chlorite-group minerals.

These silicates may be in the form of mixed layers. Since many natural ion-exchanged phyllosilicates occur as the main components of clay minerals, the ion-exchanged phyllosilicates frequently contain impurities (examples thereof include quartz and cristobalite). Such impurity-containing silicates may be used.

It is preferable that the ion-exchanged phyllosilicate according to the invention should be a phyllosilicate having a 2:1 type structure. More preferred are smectite-group silicates. Even more preferred is montmorillonite.

It is preferable that the ion-exchanged phyllosilicate according to the invention should be a phyllosilicate which has a large amount of layer charges due to a high degree of isomorphous substitution. The isomorphous substitution of an ion-exchanged phyllosilicate means the following phenomenon as described on page 124 of *Nendo Handobukku* (The Clay Science Society of Japan; Gihodo Shuppan Co., Ltd.; published in 2009; 3rd edition).

A phyllosilicate in a broad sense which includes ion-exchanged phyllosilicates is configured of octahedral sheets formed by the coordination of $O^{2-}$ or $OH^-$ to metal ions (cations) and tetrahedral sheets formed by the coordination of $O^{2-}$ to silicon ions ($Si^{4+}$). The metals which can constitute the octahedral sheet include aluminum, magnesium, iron, titanium, and the like, and the content thereof is, for example, 5-30% by weight based on the whole ion-exchanged phyllosilicate mineral.

In a 2:1 type mineral among ion-exchanged phyllosilicates, the unit silicate layer is constituted of a structure configured of two tetrahedral sheets and one octahedral sheet sandwiched therebetween. In a 1:1 mineral, the unit silicate layer is constituted of a structure configured of a tetrahedral sheet and an octahedral sheet, one surface of which has been bonded to one surface of the tetrahedral sheet. In 2:1 type minerals, in cases when the cations of the tetrahedral sheets are $Si^{4+}$ alone and when the cations of the octahedral sheets are $Al^{3+}$ alone or $Mg^{2+}$ alone, then each sheet is electrically neutral and has no charge. In 2:1 type minerals, however, some of the cations of the tetrahedral sheets and octahedral sheet have generally been replaced by other cations with a different charge number while keeping the number of coordinating $O^{2-}$ or $OH^-$ ions unchanged. This phenomenon is called isomorphous substitution.

Due to this isomorphous substitution, the silicate layer carries positive or mainly negative charges, and these charges are referred to as layer charges. Usually, an ion-exchanged phyllosilicate has exchangeable interspace ions (ions contained between the layers of the ion-exchanged phyllosilicate) for neutralizing the layer charges. Although the kind of these exchangeable ions is not particularly limited, examples thereof include alkali metals belonging to Group 1 of the periodic table, such as lithium and sodium, and alkaline earth metals belonging to Group 2 of the periodic table, such as calcium and magnesium.

Examples of the ion-exchanged phyllosilicate according to the invention include ones in which some of the $Al^{3+}$ of the octahedral sheet has been replaced by $Mg^{2+}$ or $Fe^{2+}$ by isomorphous substitution and ones in which some of the $Mg^{2+}$ has been replaced by $Li^+$ by isomorphous substitution.

For the ion-exchanged phyllosilicate according to the invention, it is preferred to use a raw material wherein the proportion in which $Al^{3+}$ has been replaced by $Mg^{2+}$ in the octahedral sheet, i.e., the molar ratio between aluminum and magnesium, Mg/Al, is 0.285-3.5. The Mg/Al molar ratio is more preferably 0.29-3, even more preferably 0.295-2, especially preferably 0.3-1.5, exceedingly preferably 0.31-1. Furthermore, the Mg/Al molar ratio is more preferably 0.315-0.8, especially 0.32-0.65, in particular 0.325-0.055.

By using such an ion-exchanged phyllosilicate, an ion-exchanged phyllosilicate which satisfies property 5 described above can be obtained. The phyllosilicates which have been disclosed so far as raw materials for catalyst components for olefin polymerization have Mg/Al ratios of about 0.25-0.27, and there have been no cases where a phyllosilicate having a high degree of isomorphous substitution is used as a raw material.

It is also possible to produce the catalyst component for olefin polymerization of the invention by subjecting the following ion-exchanged phyllosilicate to the treatment which will be shown later.

The ion-exchanged phyllosilicate to be used has a specific surface area of about 0.1-140 $m^2/g$, preferably about 0.1-90 $m^2/g$. Although relatively small, the specific surface area of the ion-exchanged phyllosilicate can be enlarged by the chemical treatment which will be described later.

It is preferable that the ion-exchanged phyllosilicate according to the invention should be produced using an ion-exchanged phyllosilicate having the following property. The ion-exchanged phyllosilicate is one in which Si(s)/Si(t) according to property 4 described above is 0.50-1.

A preferred lower limit of Si(s)/Si(t) is 0.55. The lower limit is desirably 0.60, preferably 0.65, especially preferably 0.70, more preferably 0.75, even more preferably 0.80, most preferably 0.90. Meanwhile, with respect to preferred upper limits thereof, values of Si(s)/Si(t) which are close to 1.00 are preferred since such values mean that the content of Si components other than smectite, i.e., impurities, is low. An upper limit thereof may by 0.98, or may be 0.95. It is preferable that the content of the Si component derived from dioctahedral smectite, Si(s), should be high.

By using such an ion-exchanged phyllosilicate, an ion-exchanged phyllosilicate which satisfies property 4 can be obtained.

It is also preferable that the ion-exchanged phyllosilicate according to the invention should be produced using an ion-exchanged phyllosilicate having the following property. The ion-exchanged phyllosilicate is one in which the intensity ratio between the peak (m) and peak (i), I/M, in XRD according to property 2 described above is 0-2.

A desirable lower limit of the range of the intensity ratio (I/M) is 0.001. The lower limit thereof is preferably 0.01, more preferably 0.05, even more preferably 0.1, especially preferably 0.5, most preferably 0.6. Meanwhile, a desirable upper limit of the range of the intensity ratio (I/M) is 1.5. The upper limit thereof is preferably 1.3, more preferably 1.2, even more preferably 1.0, especially preferably 0.95, most preferably 0.9.

By using such an ion-exchanged phyllosilicate, an ion-exchanged phyllosilicate which satisfies property 2 can be obtained.

An ion-exchanged phyllosilicate which shows the properties according to the invention can be produced also by subjecting an ion-exchanged phyllosilicate to a chemical treatment.

There are various chemical treatments including an acid treatment in which an ion-exchanged phyllosilicate is treated with an acid, an alkali treatment in which an ion-exchanged phyllosilicate is treated with an alkali, and a salt treatment in which an ion-exchanged phyllosilicate is treated with an inorganic salt.

A single chemical treatment may be performed alone, or two or more chemical treatments may be conducted in combination or simultaneously. It is preferred to conduct a treatment with an acid, followed by another chemical treatment. It is preferable that the ion-exchanged phyllosilicate according to the invention should have undergone a chemical treatment with an acid. More preferably, the ion-exchanged phyllosilicate has been treated with an inorganic acid, among acids.

Of the chemical treatments of an ion-exchanged phyllosilicate, an acid treatment for treating the phyllosilicate with an acid is explained below in detail. In the acid treatment, the following occurs.

In the treatment of an ion-exchanged phyllosilicate with an acid, not only surface impurities are removed by the acid, but also interspace ions are eluted and replaced by hydrogen cations. Subsequently, some of the cations constituting the octahedral sheets are gradually eluted. During this elution, the phyllosilicate changes in properties such as acid sites, pore structure, and specific surface area.

Consequently, the ion-exchanged phyllosilicate according to the invention can be accomplished by performing a treatment with an acid. Although the degree of the elution varies depending on the concentration of the acid, treatment period, and kind of the acid, elution is apt to occur generally in the order of: components having a high magnesium content; components having a high iron content; and components having a high aluminum content. Meanwhile, the higher the crystallinity and the larger the particle size, the lower the property of being eluted. This tendency relates to the penetration of the acid into the spaces between the crystal layers and into the crystal structure.

With respect to the elution, the following mechanisms are thought to be possible: even elution which is thought to yield an even structure having microvoids in all the octahedral sheets of the crystal lattices; and uneven elution in which metal cations in specific portions are eluted to yield silicic acid and a composite of this silicic acid with the phyllosilicate is yielded.

It is thought that due to the use of a raw material having a high Mg/Al molar ratio, the ion-exchanged phyllosilicate according to the invention not only has the high negativity of layer charges but also has higher evenness in elution throughout the sheets than known ion-exchanged phyllosilicates.

It is thought that the sum of the volumes of pores each having a diameter of 2-10 nm can hence be 60-100% of the total volume of mesopores.

With respect to conditions of the acid treatment, the temperature is desirably 40-102° C., preferably 50-100° C., more preferably 60-95° C. In case where too low a temperature is used, the rate of elution of cations is significantly reduced, resulting in a decrease in production efficiency. Meanwhile, too high a temperature results in a decrease in operational safety.

The acid concentration during the acid treatment (percentage by weight of the acid based on the overall weight of the reaction system) is desirably 3-30% by weight, preferably 5-25% by weight, more preferably 7-20% by weight. In case where the concentration thereof is too low, the rate of elution of cations is low, resulting in a decrease in production efficiency.

Meanwhile, the concentration of the ion-exchanged phyllosilicate can be in the range of 3-50% by weight. The concentration thereof is preferably 5-30% by weight, more preferably 5-20% by weight. In case where the concentration thereof is too low, larger equipment is undesirably necessary for industrial production. Meanwhile, in case where the concentration thereof is too high, the slurry undesirably has an increased viscosity to make even stirring and mixing difficult, resulting in a decrease in production efficiency in this case also.

The acid treatment can be performed in installments.

Examples of usable acid compounds include inorganic acids and organic acids, such as hydrochloric acid, sulfuric acid, nitric acid, oxalic acid, benzoic acid, stearic acid, propionic acid, fumaric acid, maleic acid, and phthalic acid. Preferred of these are the inorganic acids, i.e., hydrochloric acid, nitric acid, and sulfuric acid. More preferred are hydrochloric acid and sulfuric acid. Especially preferred is sulfuric acid.

Through the chemical treatment, in particular, an acid treatment, some of the metal cations constituting the octahedral sheets are eluted preferably in an amount of 10-65% based on the content thereof as determined before the chemical treatment. The elution amount thereof is more preferably 15-60%, even more preferably 17-55%, especially preferably 20-50%. In case where the proportion of the metal cations eluted is too small, a sufficient pore amount cannot be ensured and a reduced specific surface area results, making it impossible to obtain the ion-exchanged phyllosilicate according to the invention.

The proportion (% by mole) of the metal cations eluted is represented by the following expression in the case where the metal cations are, for example, aluminum.

[((Aluminum before chemical treatment)/silicon (molar ratio))−((aluminum after chemical treatment)/silicon (molar ratio))]÷((aluminum before chemical treatment)/silicon (molar ratio))×100

There is a possibility that reaction products or unreacted substances which remain in the reaction solution after the chemical treatment has been performed might cause a decrease in activity. It is therefore preferred to rinse the treated phyllosilicate. For this rinsing, a liquid such as water or an organic solvent is generally used.

The degree of rinsing may be $\frac{1}{5}$ to $\frac{1}{1,000}$, preferably $\frac{1}{10}$ to $\frac{1}{100}$. After the rinsing and dehydration, drying is conducted. It is preferable that the drying should be performed so as not to destroy the structure of the ion-exchanged phyllosilicate. The drying can be conducted at a temperature of generally 100-800° C., preferably 150-600° C. The drying temperature is especially preferably 150-300° C. It is preferred to conduct the drying at a drying temperature of 800° C. or lower so that the structure of the ion-exchanged phyllosilicate is not destroyed.

Even when such ion-exchanged phyllosilicates undergo no structural destruction, the properties thereof vary depending on the drying temperature. It is therefore preferred to change the drying temperature in accordance with applications. The drying period is usually 1 minute to 24 hours, preferably 5 minutes to 4 hours. The atmosphere is preferably dry air, dry nitrogen, or dry argon, or preferably has a reduced pressure. Methods for the drying are not particularly limited, and various methods can be used.

In general, ion-exchanged phyllosilicates contain adsorbed water and water present between the layers. In the invention, it is preferred to remove the adsorbed water and the water present between the layers, before the ion-exchanged phyllosilicate is used.

For removing the water, a heat treatment is usually employed. Although methods therefor are not particularly limited, it is preferred to select conditions under which the adherent water and the water present between the layers are wholly removed and under which no structural destruction occurs.

The heating period may be 0.1 hour or longer, preferably 0.2 hours or longer. It is preferred to conduct this heating so that the dehydrated phyllosilicate has a water content of 3% by weight or less, preferably 1% by weight or less, when the water content of the phyllosilicate dehydrated for 2 hours under the conditions of a temperature of 200° C. and a pressure of 1 mmHg is taken as 0% by weight.

Although a process for producing an ion-exchanged phyllosilicate which shows the properties according to the invention was described above, production processes by which the properties according to the invention are obtained are not limited to the process described above and other processes can be used.

One preferred embodiment of the process for producing an ion-exchanged phyllosilicate for use as the catalyst component for olefin polymerization of the invention is a process which includes a treatment step wherein an ion-exchanged phyllosilicate which has a specific surface area of 0.1-140 m$^2$/g and in which the molar ratio between aluminum and magnesium, Mg/Al, is 0.285-3.5, I/M satisfies 0<(I/M)≤2, and Si(s)/Si(t) is 0.50-1 is treated to eliminate 10-65% by mole of the main metal cations of the octahedral sheets.

(9) Average Particle Diameter of the Ion-Exchanged Phyllosilicate in Aqueous Dispersion It is preferable that the ion-exchanged phyllosilicate according to the invention, in the state of having been dispersed in water, should have a smaller average particle diameter. A smaller average particle diameter thereof is thought to contribute to an increase in specific surface area per unit weight. The expression "state of having been dispersed in water" means the state in which the phyllosilicate has been sufficiently conformed to water, for example, by preparing a 0.5 wt % aqueous slurry of the ion-exchanged phyllosilicate while forcedly agitating the mixture with a stirrer or the like in order to homogenize the mixture, allowing the slurry to stand overnight, and then subjecting the slurry to a 10-minute ultrasonic treatment.

For determining the average particle diameter, a particle size analyzer of the laser diffraction scattering type (e.g., LA-920, manufactured by HORIBA) is used to examine the particles using water as the medium.

The term "average particle diameter" means the median diameter obtained through this measurement. An upper limit of the median diameter thereof is preferably 5 µm or less, more preferably 2.5 µm or less, even more preferably 1.5 µm or less, especially preferably 1 µm or less. The smaller the average particle diameter, the more the ion-exchanged phyllosilicate is preferred. Although there is no particular lower limit, examples thereof is, for example, 0.01 µm or larger.

(10) Granulation of the Ion-Exchanged Phyllosilicate

The ion-exchanged phyllosilicate according to the invention can be one in the form of granules obtained by granulating the ion-exchanged phyllosilicate described above. Use of such granules is preferred.

Methods for the granulation are not particularly limited. Preferred examples of methods for producing the granules include stirring granulation, spray granulation, rolling granulation, briquetting, compacting, extrusion granulation, fluidized-bed granulation, emulsion granulation, in-liquid granulation, and compression molding granulation. More preferred examples thereof include spray drying granulation, spray cooling granulation, fluidized-bed granulation, spouted-bed granulation, in-liquid granulation, and emulsion granulation. Especially preferred examples thereof include spray drying granulation and spray cooling granulation.

In the case of conducting spray granulation, water or an organic solvent such as methanol, ethanol, chloroform, methylene chloride, pentane, hexane, heptane, toluene, or xylene is used as the dispersion medium of the raw-material slurry. Preferably, water is used as the dispersion medium.

In the case of spray granulation, the concentration of the ion-exchanged phyllosilicate in the raw-material slurry is regulated to 0.1-70% by weight, preferably 5-50% by weight, more preferably 7-45% by weight, even more preferably 10-40% by weight. Thus, spherical granules are obtained. In case where the concentration thereof exceeds the upper limit, spherical particles are not obtained. In case where the concentration thereof is less than the lower limit, the resultant granules have too small an average particle diameter. The inlet temperature of the hot air for obtaining spherical particles in the spray granulation varies depending on the dispersion medium. In the case of water, for example, the spray granulation may be conducted at 80-260° C., preferably 100-220° C.

For the granulation, any of various binders such as organic substances and inorganic salts may be used. Examples of usable binders include sugar, dextrose, corn syrup, gelatin, glue, carboxymethyl cellulose and derivatives thereof, poly(vinyl alcohol), water glass, magnesium chloride, aluminum sulfate, aluminum chloride, magnesium sulfate, alcohols, glycols, starch, casein, latexes, poly(ethylene glycol), poly(ethylene oxide), tar, pitch, alumina sol, silica gel, gum arabic, and sodium alginate.

There is no particular limitation on the shape of the ion-exchanged phyllosilicate to be granulated. The shape may be that of an ion-exchanged phyllosilicate which has occurred naturally, or may be that of an ion-exchanged phyllosilicate which has been artificially synthesized. Furthermore, an ion-exchanged phyllosilicate which has been processed for shape alteration by pulverization, granulation, classification, etc. may be used.

It is preferable that the granulated ion-exchanged phyllosilicate should have a particle diameter of 5-300 µm and be spherical. The particle diameter thereof is more preferably 5-250 µm, even more preferably 5-200 µm. In case where the granulated ion-exchanged phyllosilicate contains fine particles smaller than 5 µm in a large amount, troubles such as adhesion to the reactor are prone to occur and the fine particles are causative of polymer agglomeration and, in some polymerization processes, of short passing or prolonged stagnation. The presence of a large amount of such fine particles is hence undesirable. Coarse particles larger than 300 µm or larger are undesirable because such coarse particles arouse problems, e.g., a tendency to cause clogging. Particle diameter may be controlled by classification, fractionation, etc. in order to attain an average particle diameter which satisfies those requirements or in the case where there are particles having an exceedingly small or exceedingly large particle diameter as compared with the average particle diameter.

2. Catalyst for Olefin Polymerization

The ion-exchanged phyllosilicate according to the invention is suitable for use as a catalyst component for olefin polymerization. Examples of catalysts for olefin polymerization generally include Ziegler-Natta catalysts and metallocene catalysts.

In the invention, a catalyst for olefin polymerization can be prepared preferably by contacting component (a) and component (b) and optionally component (c).

Component (a): a metallocene compound of a transition metal belonging to Group 4 of the periodic table
Component (b): the ion-exchanged phyllosilicate
Component (c): an organoaluminum compound (1) Component (a)

The metallocene compound of a transition metal belonging to Group 4 of the periodic table, which is used as component (a) in the invention, is a metallocene compound having at least one conjugated five-membered ring ligand. Preferred as this transition metal compound are compounds represented by the following general formulae (1) to (4).

[Chem. 1]

  (1)

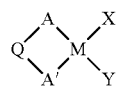  (2)

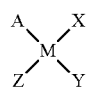  (3)

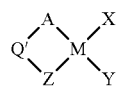  (4)

In general formulae (1) to (4), A and A' each represent a conjugated five-membered ring ligand which may have one or more substituents (in the same compound, A and A' may be the same or different), and Q represents a bonding group which links the two conjugated five-membered ring ligands to each other at any desired positions. Z represents a ligand which includes a nitrogen atom an oxygen atom, a silicon atom, a phosphorus atom, or a sulfur atom, and Q' represents a bonding group which links the conjugated five-membered ring ligand at any desired position to the Z. M represents an atom of a metal selected from Group 4 of the periodic table, and X and Y each represent a hydrogen atom, a halogen atom, a hydrocarbon group, an alkoxy group, an amino group, a phosphorus-containing hydrocarbon group, or a silicon-containing hydrocarbon group (in the same compound, X and X' may be the same or different).

Examples of A and A' include a cyclopentadienyl group. The cyclopentadienyl group may be the group having five hydrogen atoms [$C_5H_5$—], or may be a derivative thereof, i.e., a cyclopentadienyl group in which some of the hydrogen atoms have been replaced by substituents.

Examples of the substituents include hydrocarbon groups having 1-40, preferably 1-30, carbon atoms. One such hydrocarbon group may have been bonded as a monovalent group to the cyclopentadienyl group. In cases where there are multiple such hydrocarbon groups, two of these may have been bonded to each other at the respective other ends (ω-ends) to form a ring in cooperation with part of the cyclopentadienyl. Examples of the latter include ones in which two substituents have been bonded to each other at the respective ω-ends to form a fused six-membered ring which possesses two adjoining carbon atoms of the cyclopentadienyl group, i.e., indenyl, tetrahydroindenyl, and fluorenyl, and ones in which two substituents have been thus bonded to each other to form a fused seven-membered ring, i.e., azulenyl and tetrahydroazulenyl.

Preferred examples of the conjugated five-membered ring ligands represented by A and A' include substituted or unsubstituted cyclopentadienyl, indenyl, fluorenyl, and azulenyl groups. Especially preferred of these are substituted or unsubstituted indenyl and azulenyl groups.

Examples of the substituents on the cyclopentadienyl group include the hydrocarbon groups having 1-40, preferably 1-30, carbon atoms, and further include halogen atoms such as fluorine, chlorine, and bromine, alkoxy groups having 1-12 carbon atoms, silicon-containing hydrocarbon groups represented by, for example, —Si($R^1$)($R^2$)($R^3$), phosphorus-containing hydrocarbon groups represented by —P($R^1$)($R^2$), and boron-containing hydrocarbon groups represented by —B($R^1$)($R^2$). In the case where there are multiple such substituents, these substituents may be the same or different. The $R^1$, $R^2$, and $R^3$ shown above may be the same or different, and each represent an alkyl group having 1-24, preferably 1-18, carbon atoms.

Any of the substituents on the cyclopentadienyl group may have at least one Group 15 or 16 element (i.e., heteroelement). In this case, a metallocene complex in which the element in Group 15 or 16 has been bonded to the conjugated five-membered ring ligand through less than two atoms is more preferred on the basis of the idea that the heteroelement itself is caused to be present in the vicinity of an active site without combining with or coordinating to the metal and to thereby improve the properties of the active site.

There are no particular limitations on the position of the Group 15 or 16 element on the ligand. It is, however, preferable that the Group 15 or 16 element should be possesses by a 2-position substituent. It is more preferable that the 2-position substituent should be a mono- or polycyclic group including a five- or six-membered ring which contains a heteroatom selected from the group consisting of oxygen, sulfur, nitrogen, and phosphorus atoms. Furthermore, it is preferable that the substituent should be a heteroaromatic group which has 4-20 carbon atoms and may have silicon or a halogen. This heteroaromatic group preferably has a five-membered ring structure, and the heteroatom is preferably an oxygen, sulfur, or nitrogen atom, more preferably an oxygen or sulfur atom, even more preferably an oxygen atom.

Q represents a bonding group which links the two conjugated five-membered ring ligands to each other at any desired positions, and Q' represents a bonding group which links the conjugated five-membered ring ligand at any desired position to the group represented by Z.

Examples of Q and Q' include the following groups.

(i) Alkylene groups such as methylene, ethylene, isopropylene, phenylmethylmethylene, diphenylmethylene, and cyclohexylene.

(ii) Silylene groups such as dimethylsilylene, diethylsilylene, dipropylsilylene, diphenylsilylene, methylethylsilylene, methylphenylsilylene, methyl-t-butylsilylene, disilylene, and tetramethyldisilylene.

(iii) Hydrocarbon groups which contain germanium, phosphorus, nitrogen, boron, or aluminum.

More specifically, such groups are groups represented by $(CH_3)_2Ge$, $(C_6H_5)_2Ge$, $(CH_3)P$, $(C_6H_5)P$, $(C_4H_9)N$, $(C_6H_5)N$, $(C_4H_9)B$, $(C_6H_5)B$, $(C_6H_5)Al$, and $(C_6H_5O)Al$. Preferred are alkylene groups and silylene groups.

M represents an atom of a metal, i.e., a transition metal, selected from Group 4 of the periodic table. Specifically, M is titanium, zirconium, hafnium, etc. Especially preferred is zirconium or hafnium.

Z represents a ligand which includes a nitrogen atom, oxygen atom, silicon atom, phosphorus atom, or sulfur atom, or represents a hydrogen atom, a halogen atom, or a hydrocarbon group. Preferred examples thereof are an oxygen atom, a sulfur atom, a thioalkoxy group having 1-20, preferably 1-12, carbon atoms, a silicon-containing hydrocarbon group having 1-40, preferably 1-18, carbon atoms, a nitrogen-containing hydrocarbon group having 1-40, preferably 1-18, carbon atoms, a phosphorus-containing hydrocarbon group having 1-40, preferably 1-18, carbon atoms, a hydrogen atom, a chlorine atom, a bromine atom, and a hydrocarbon group having 1-20 carbon atoms.

X and Y are each a hydrogen atom, a halogen atom, a hydrocarbon group having 1-20, preferably 1-10, carbon atoms, an alkoxy group having 1-20, preferably 1-10, carbon atoms, an amino group, a phosphorus-containing hydrocarbon group having 1-20, preferably 1-12, carbon atoms, such as diphenylphosphino, or a silicon-containing hydrocarbon group having 1-20, preferably 1-12, carbon atoms, such as trimethylsilyl and bis(trimethylsilyl)methyl. X and Y may be the same or different. Especially preferred of these are a halogen atom, a hydrocarbon group having 1-10 carbon atoms, and an amino group having 1-12 carbon atoms.

Examples of the compounds represented by general formula (1) include (1) bis(methylcyclopentadienyl)zirconium dichloride,
(2) bis(n-butylcyclopentadienyl)zirconium dichloride,
(3) bis(1,3-dimethylcyclopentadienyl)zirconium dichloride,
(4) bis(1-n-butyl-3-methylcyclopentadienyl)zirconium dichloride,
(5) bis(1-methyl-3-trifluoromethylcyclopentadienyl)zirconium dichloride,
(6) bis(1-methyl-3-trimethylsilylcyclopentadienyl)zirconium dichloride,
(7) bis(1-methyl-3-phenylcyclopentadienyl)zirconium dichloride,
(8) bis(indenyl)zirconium dichloride, (9) bis(tetrahydroindenyl)zirconium dichloride, and
(10) bis(2-methyltetrahydroindenyl)zirconium dichloride.

Examples of the compounds represented by general formula (2) include
(1) dimethylsilylenebis{1-(2-methyl-4-isopropyl-4H-azulenyl)}zirconium dichloride,
(2) dimethylsilylenebis{1-(2-methyl-4-phenyl-4H-azulenyl)}zirconium dichloride,
(3) dimethylsilylenebis[1-{2-methyl-4-(4-fluorophenyl)-4H-azulenyl}]zirconium dichloride,
(4) dimethylsilylenebis[1-{2-methyl-4-(2,6-dimethylphenyl)-4H-azulenyl}]zirconium dichloride,
(5) dimethylsilylenebis{1-(2-methyl-4,6-diisopropyl-4H-azulenyl)}zirconium dichloride,
(6) diphenylsilylenebis{1-(2-methyl-4-phenyl-4H-azulenyl)}zirconium dichloride,
(7) dimethylsilylenebis{1-(2-ethyl-4-phenyl-4H-azulenyl)}zirconium dichloride,
(8) ethylenebis{1-[2-methyl-4-(4-biphenylyl)-4H-azulenyl]}zirconium dichloride,
(9) dimethylsilylenebis {1-[2-ethyl-4-(2-fluoro-4-biphenylyl)-4H-azulenyl]}zirconium dichloride,
(10) dimethylsilylenebis {1-[2-methyl-4-(2',6'-dimethyl-4-biphenylyl)-4H-azulenyl]}zirconium dichloride,
(11) dimethylsilylene{1-[2-methyl-4-(4-biphenylyl)-4H-azulenyl]}{1-[2-methyl-4-(4-biphenylyl)indenyl]}zirconium dichloride,
(12) dimethylsilylene {1-(2-ethyl-4-phenyl-4H-azulenyl)}{1-(2-methyl-4,5-binzoindenyl)}zirconium dichloride,
(13) dimethylsilylenebis{1-(2-ethyl-4-phenyl-7-fluoro-4H-azulenyl)}zirconium dichloride,
(14) dimethylsilylenebis{1-(2-ethyl-4-indolyl-4H-azulenyl)}zirconium dichloride,
(15) dimethylsilylenebis[1-{2-ethyl-4-(3,5-bistrifluoromethylphenyl)-4H-azulenyl}]zirconium dichloride,
(16) dimethylsilylenebis{1-(2-methyl-4-phenyl-4H-azulenyl)}zirconium bis(trifluoromethanesulfonic acid),
(17) dimethylsilylenebis{1-(2-methyl-4-phenylindenyl)}zirconium dichloride,
(18) dimethylsilylenebis{1-(2-methyl-4,5-benzoindenyl)}zirconium dichloride,
(19) dimethylsilylenebis[1-{2-methyl-4-(1-naphthyl)indenyl}]zirconium dichloride,
(20) dimethylsilylenebis{1-(2-methyl-4,6-diisopropylindenyl)}zirconium dichloride,
(21) dimethylsilylenebis {(1-(2-ethyl-4-phenylindenyl)}zirconium dichloride,
(22) ethylene-1,2-bis {1-(2-methyl-4-phenylindenyl)}zirconium dichloride,
(23) ethylene-1,2-bis{1-(2-ethyl-4-phenylindenyl)}zirconium dichloride,
(24) isopropylidenebis{1-(2-methyl-4-phenylindenyl)}zirconium dichloride,
(25) ethylene-1,2-bis{1-(2-methyl-4-phenyl-4H-azulenyl)}zirconium dichloride,
(26) isopropylidenebis {1-(2-methyl-4-phenyl-4H-azulenyl)}zirconium dichloride,
(27) dimethylgermylenebis{1-(2-methyl-4-phenylindenyl)}zirconium dichloride,
(28) dimethylgermylenebis{1-(2-ethyl-4-phenylindenyl)}zirconium dichloride,
(29) phenylphosphinobis{1-(2-ethyl-4-phenylindenyl)}zirconium dichloride,
(30) dimethylsilylenebis{3-(2-furyl)-2,5-dimethylcyclopentadienyl]zirconium dichloride,
(31) dimethylsilylenebis[2-(2-furyl)-3,5-dimethylcyclopentadienyl]zirconium dichloride,
(32) dimethylsilylenebis[2-(2-furyl)indenyl]zirconium dichloride,
(33) dimethylsilylenebis[2-(2-(5-methyl)furyl)-4,5-dimethylcyclopentadienyl]zirconium dichloride,
(34) dimethylsilylenebis[2-(2-(5-trimethylsilyl)furyl)-4,5-dimethylcyclopentadienyl]zirconium dichloride,
(35) dimethylsilylenebis[2-(2-thienyl)indenyl]zirconium dichloride,
(36) dimethylsilylene[2-(2-(5-methyl)furyl)-4-phenylindenyl][2-methyl-4-phenylindenyl]zirconium dichloride,
(37) dimethylsilylenebis(2,3,5-trimethylcyclopentadienyl)zirconium dichloride,
(38) dimethylsilylenebis(2,3-dimethyl-5-ethylcyclopentadienyl)zirconium dichloride, and
(39) dimethylsilylenebis(2,5-dimethyl-3-phenylcyclopentadienyl)zirconium dichloride.

Examples of the compounds represented by general formula (3) include
(1) (tetramethylcyclopentadienyl)titanium (bis-t-butylamido) dichloride,
(2) (tetramethylcyclopentadienyl)titanium (bisisopropylamido) dichloride,
(3) (tetramethylcyclopentadienyl)titanium (biscyclododecylamido) dichloride,
(4) (tetramethylcyclopentadienyl)titanium {bis(trimethylsilyl)amido}}dichloride,
(5) (2-methyl-4-phenyl-4H-azulenyl)titanium {bis(trimethylsilyl)amido}dichloride,
(6) (2-methylindenyl)titanium (bis-t-butylamido) dichloride,
(7) (fluorenyl)titanium (bis-t-butylamido) dichloride,
(8) (3,6-diisopropylfluorenyl)titanium (bis-t-butylamido) dichloride,
(9) (tetramethylcyclopentadienyl)titanium (phenoxido) dichloride, and
(10) (tetramethylcyclopentadienyl)titanium (2,6-diisopropylphenoxido) dichloride.

Examples of the compounds represented by general formula (4) include
(1) dimethylsilanediyl(tetramethylcyclopentadienyl)(t-butylamido)titanium dichloride,
(2) dimethylsilanediyl(tetramethylcyclopentadienyl)(cyclododecylamido)titanium dichloride,
(3) dimethylsilanediyl(2-methylindenyl)(t-butylamido)titanium dichloride, and
(4) dimethylsilanediyl(fluorenyl)(t-butylamido)titanium dichloride.

Examples of the metallocene compound further include the compounds shown above as examples in which the "dichloride" has been replaced by dibromide, difluoride, dimethyl, diphenyl, dibenzyl, bisdimethylamido, bisdiethylamido, or the like. Furthermore, examples thereof include the compounds shown above as examples in which the "zirconium" has been replaced by hafnium or titanium or in which the "titanium" has been replaced by hafnium or zirconium.

It is preferable that the transition metal compound to be used in the invention should be a compound represented by general formula (2). Especially preferred is a compound in which substituents have formed a fused seven-membered ring, i.e., a compound having an azulenyl group or tetrahydroazulenyl group.

One metallocene compound may be used alone, or two or more metallocene compounds may be used in combination.

In the case of using two or more metallocene compounds in combination, the two or more compounds can be selected from the compounds represented by any one of general formulae (1) to (4). Alternatively, one or more compounds selected from the compounds represented by one of those general formulae may be used together with one or more compounds selected from the compounds represented by another general formula.

Examples thereof include a combination of: a metallocene compound (a-1), which is a metallocene compound that forms a polymerization catalyst which yields olefin macromers; and a metallocene compound (a-2) represented by general formula (4). The metallocene compound that forms a polymerization catalyst which yields olefin macromers is a metallocene compound which, when propylene alone is polymerized at 70° C., forms a propylene homopolymer having a terminal vinyl ratio of 0.5 or higher. The molar ratio of component (a-2) to component (a-1), (a-2)/(a-1), can be 1.0-99.0.

(2) Component (c)

Component (c) is an organoaluminum compound.

The organoaluminum compound to be used as component (c) in the invention may be an organoaluminum compound represented by the general formula $(AlR_nX_{3-n})_m$. In the formula. R represents an alkyl group having 1-20 carbon atoms, and X represents a halogen atom, a hydrogen atom, an alkoxy group, or an amino group. Symbol n represents an integer of 1-3, and m represents 1 or 2. One such organoaluminum compound can be used alone, or multiple such organoaluminum compounds can be used in combination.

Examples of the organoaluminum compound include trimethylaluminum, triethylaluminum, tri-n-propylaluminum, tri-n-butylaluminum, triisobutylaluminum, tri-n-hexylaluminun, tri-n-octylaluminum, tri-n-decylaluminum, diethylaluminum chloride, diethylaluminum sesquichloride, diethylaluminum hydride, diethylaluminum ethoxide, diethylaluminum dimethylamide, diisobutylaluminum hydride, and diisobutylaluminum chloride.

Preferred of these are trialkylaluminums in which m=1 and n=3 and alkylaluminum hydrides. More preferred are trialkylaluminums in which R has 1-8 carbon atoms.

(3) Preparation of the Catalyst for Olefin Polymerization

The catalyst for olefin polymerization of the invention is prepared by contacting component (a) and component (b) and optionally component (c).

Although methods for the contact are not particularly limited, the components can be contacted in the following sequences. This contact may be conducted in the absence of a monomer or in the presence of a monomer. For contacting these components, a solvent may be used in order to sufficiently perform the contact. Examples of the solvent include aliphatic saturated hydrocarbons, aromatic hydrocarbons, aliphatic unsaturated hydrocarbons, halides of these hydrocarbons, and monomers to be polymerized preliminarily.

(i) Component (a) and component (b) are contacted with each other.
(ii) Component (a) and component (b) are contacted with each other, and component (c) is then contacted therewith.
(iii) Component (b) and component (c) are contacted with each other, and component (a) is then contacted therewith.
(iv) Component (a) and component (c) are contacted with each other, and component (b) is then contacted therewith.
(v) The three components are simultaneously contacted.

A preferred contact method is a method which includes: contacting component (b) and component (c) with each other; subsequently removing the unreacted part of the component (c) by rinsing or the like; thereafter contacting component (c) in a minimum necessary amount with the component (b) again; and then contacting component (a) with the mixture. In this case, the Al/transition metal molar ratio may be in the range of 0.1-1,000, preferably 2-100, more preferably 4-50.

The temperature at which component (b) and component (c) are contacted with each other (this contact may be performed in the presence of component (a)) is preferably 0-100° C., more preferably 20-80° C., especially preferably 30-60° C. In case where the temperature is lower than that range, there is a drawback in that the reaction is slow. In case where the temperature is higher than the upper limit, there is a drawback in that side reactions proceed.

In the case where component (a) and component (c) are contacted with each other (this contact may be performed in the presence of component (b)), it is preferred to cause an organic solvent to be present as a solvent. In this case, it is preferable that the concentration of component (a) in the organic solvent should be higher. A preferred lower limit of the concentration of component (a) in the organic solvent is preferably 3 mmol/L, more preferably 4 mmol/L, even more preferably 6 mmol/L. In case where the concentration thereof is less than the lower limit, there is a possibility that the reaction might be slow and the progress thereof might be insufficient.

The amount of component (a) per g of component (b) may be in the range of 0.001-10 mmol, preferably 0.001-1 mmol.

From the standpoint of improving particle properties, it is preferable that the catalyst of the invention should be subjected to a preliminary polymerization treatment in which an olefin is brought into contact therewith and polymerized in advance in a small amount. Although the olefin to be used is not particularly limited, use can be made of ethylene, propylene, 1-butene, 1-hexene, 1-octene, 4-methyl-1-pentene, 3-methyl-1-butene, vinylcycloalkanes, styrene, and the like. It is especially preferred to use propylene.

For supplying the olefin, any desired method can be used, such as a feeding method in which the olefin is supplied at a constant rate to the reaction vessel or is supplied so that a constant pressure is maintained, a method employing a combination of these, or a method in which the rate or pressure is changed in stages.

The period of the preliminary polymerization is not particularly limited. However, the period thereof is preferably in the range of 5 minutes to 24 hours. The amount of the olefin to be subjected to the preliminary polymerization is such that the amount of the polymer yielded by the preliminary polymerization per g of component (b) is preferably 0.01-100 g, more preferably 0.1-50 g.

The temperature for the preliminary polymerization is not particularly limited. However, the temperature therefor is preferably 0-100° C., more preferably 10-70° C., especially preferably 20-60° C., even more preferably 30-50° C. In case where the temperature is lower than that range, there is the possibility of arousing a trouble that the reaction rate decreases or the activation reaction does not proceed. Meanwhile, in case where the temperature for the preliminary polymerization is higher than the upper limit, there is the possibility of arousing a trouble that the polymer formed by the preliminary polymerization melts or the rate of preliminary polymerization is so high that impaired particle properties result or active sites are deactivated by side reactions.

The preliminary polymerization can be conducted in a liquid, e.g., an organic solvent, and this mode is preferred. The concentration of the catalyst during the preliminary polymerization is not particularly limited. However, the concentration thereof is preferably 30 g/L or higher, more preferably 40 g/L or higher, especially preferably 45 g/L or higher. The higher the concentration thereof, the more the metallocene activation proceeds and the higher the activity of the catalyst.

It is also possible to use a method in which during or after the contact of the components, a polymer such as polyethylene, polypropylene, or polystyrene or a solid inorganic oxide such as silica or titania is caused to coexist therewith.

The catalyst which has undergone the preliminary polymerization may be used as such or may be dried. Methods for the drying are not particularly limited, and examples thereof include vacuum drying, thermal drying, and drying by passing a drying gas. One of these methods may be used alone, or two or more of these methods may be used in combination. During the drying step, the catalyst may be stirred, vibrated, or fluidized, or may be allowed to stand.

3. Process for Producing Olefin (Co)Polymer

Polymerization with the olefin polymerization catalyst, which includes component (a) and component (b) and optionally further includes component (c), is accomplished by polymerizing one olefin or copolymerizing two or more olefins.

In the case of copolymerization, the amount ratio between the monomers in the reaction system need not be constant over the lapse of time. The monomers can be fed while keeping the mixing ration thereof constant, or the mixing ration between the monomers being fed can be changed with the lapse of time. Furthermore, any of the monomers can be added in installments in view of a copolymerization ratio.

The olefins which can be polymerized preferably are ones having about 2-20 carbon atoms. Examples thereof include ethylene, propylene, 1-butene, 1-pentene, 1-hexene, 1-octene, styrene, divinylbenzene, 7-methyl-1,7-octadiene, cyclopentene, norbornene, and ethylidenenorbornene. Preferred are α-olefins having 2-8 carbon atoms. More preferred are ethylene and propylene. In the case of copolymerization, the comonomer(s) to be used can be one or more olefins selected from the olefins enumerated above other than the olefin serving as the main ingredient. It is preferable that the main ingredient should be propylene.

With respect to modes of polymerization, any mode can be employed so long as the catalyst efficiently comes into contact with the monomer(s). Specifically, use can be made of, for example, a slurry method in which an inactive solvent is used, a method in which substantially no inactive solvent is used and propylene is used as a solvent, a solution polymerization method, and a gas-phase method in which substantially no liquid solvent is used and the one or more monomers are kept gaseous. Methods in which continuous polymerization or batch polymerization is conducted are also usable.

In the case of slurry polymerization, use may be made of a polymerization solvent which is either one solvent selected from saturated aliphatic hydrocarbons and aromatic hydrocarbons, such as hexane, heptane, pentane, cyclohexane, benzene, and toluene, or a mixture of such hydrocarbons. The polymerization temperature may be 0-150° C., and hydrogen can be used in an auxiliary manner as a molecular weight regulator. A suitable polymerization pressure is 0-2,000 kg/cm$^2$G, preferably 0-60 kg/cm$^2$G.

The olefin (co)polymer to be obtained by the production process of the invention is not particularly limited. However, examples thereof include ethylene homopolymers, propylene homopolymers, propylene/ethylene block copolymers, propylene/ethylene random copolymers, and propylene/ethylene/α-olefin copolymers.

EXAMPLES

The present invention will be explained below in detail by reference to Examples, but the invention should not be construed as being limited by the following Examples.

The analytical instruments and apparatus used for determining properties and the methods used for the determination are as follows.

(Methods for Determining Various Properties)

(1) Compositional Analysis of Ion-Exchanged Phyllosilicate:

Calibration curves were drawn through chemical analyses according to JIS, and the contents of compounds were determined by fluorescent X-ray analysis.

The apparatus used was ZSX-100e, manufactured by Rigaku Industrial Corp. A specimen was prepared by burning the phyllosilicate at 700° C. for 1 hour, subsequently taking out a 0.5-g portion therefrom, mixing the portion with 4.5 g of a flux ($Li_2B_4O_7$) and 0.03 g of a release agent (KBr), and forming glass beads from the mixture.

The calibration curve ranges for respective atoms are as follows.

Si, 19.8-44.22%; Al, 2.01-19.4%; Mg, 0.22-3.02%; Na, 0.21-3.62%; Fe, 0.53-5.83%.

With respect to Ca and K, the contents thereof were determined by ICP emission spectroscopy. Sulfuric acid and hydrofluoric acid were added to the specimen which had been burned at 700° C. for 1 hour, and the mixture was heated to dissolve the specimen. Thereafter, this solution was examined with an ICP-OES (ULTIMA Type 2, manufactured by Horiba Ltd.).

(2) Determination of Pore Distribution and Determination of Specific Surface Area:

A pore distribution and a specific surface area were determined by the nitrogen adsorption method. At the liquid-nitrogen temperature, an adsorption isotherm was determined. The adsorption isotherm obtained was subjected to BET multipoint analysis to determine the specific surface area.

Furthermore, using the adsorption isotherm, the sum of the volumes of pores each having a diameter of 2-10 nm and a mesopore distribution were determined by the BJH analysis method.

Apparatus: Autosorb 3B, manufactured by Quantachrome Instruments

Measurement method: nitrogen gas adsorption method

Pretreatment conditions: the specimen is heated at 200° C. under vacuum (1.3 MPa or lower) for 2 hours Specimen amount: about 0.2 g Gas liquefaction temperature: 77 K (3) Measurement of Particle Diameter:

(3-1) Granulated Product and Catalyst

Using particle diameter distribution analyzer of the laser diffraction scattering type LA-920, manufactured by HORIBA Ltd., a measurement was made using ethanol as the dispersion medium under the conditions of a refractive index of 1.3 and a shape factor of 1.0.

The term "particle diameter" means median diameter.

(3-2) Raw Material

A 0.05-g portion was weighed out from the ion-exchanged phyllosilicate and gradually added to 9.95 g of distilled water with stirring with a stirrer, thereby preparing a homogeneous 0.5 wt % aqueous slurry. This slurry was allowed to stand overnight (for 12 hours or more). This aqueous slurry was subjected to a 10-minute ultrasonic treatment and then examined with a particle size analyzer of the laser diffraction scattering type (e.g., particle analyzer of the laser diffraction scattering type LA-920, manufactured by HORIBA Ltd.) using water as the dispersion medium under the conditions of a refractive index of 1.3 and a shape factor of 1.0. The term "particle diameter" means median diameter.

(4) MFR (Melt Flow Rate):

Using a melt indexer manufactured by TAKARA, a measurement was made in accordance with JIS K7210 "Plastics: Method for Measuring Melt Mass Flow Rate (MFR) and Melt Volume Flow Rate (MVR) of Thermoplastics" under the test conditions of 230° C. and a load of 2.16 kg.

(5) X-Ray Diffractometry:

(5-1) Measurement Conditions of X-Ray Diffractometry

The samples used in the invention were each examined under the following measurement conditions of X-ray diffractometry.

Apparatus: X-ray Diffractometer Smartlab, manufactured by Rigaku Corp.
    X-ray source: Cu-Kα line (obtained using K3 absorbing plate); tube voltage, 40 kV; tube current, 30 mA
    Optical system: focusing mode
    Divergence slit, ⅔ degrees; scattering slit, ⅔ degrees; receiving slit, 0.300 mm
    Scan mode: 2θ/θ scan
    2θ scan range: 3.0000-55.0000 degrees
    Angle step interval: 0.0200 degrees
    Scanning rate: 4.0000 degrees/min
    Detector: scintillation counter
    Sample holder: holder made of glass and having a depth of 0.2 mm (5-2) Method of Processing Data of X-Ray Diffractometry (Method of Intensity Determination)

An X-ray diffraction intensity can be obtained in terms of the count in relation to 2θ indicated by the scintillation counter. A base line for diffraction intensity is determined in the following manner. With respect to each of 2θ values of 15 degrees and 25 degrees, an average intensity for the peripheral range of ±0.1 degree (an average for 11 points since the angle step is 0.02 degrees) is determined. These average values are taken respectively as the intensities at 2θ's of 15 degrees and 25 degrees.

A straight line is drawn so as to connect these two points, and this straight line is taken as the base line. If any diffraction peak assignable to the sample has appeared in the 2θ range of 15±0.1 degrees or 25±0.1 degrees, a peak-free 2θ position is selected in a peripheral several-degree area so as to avoid that peak, and an intensity for base line is determined with respect to this 2θ position. Incidentally, for assessing whether a peak is present or not, use is made of a method in which the measured diffraction intensities are plotted against 2θ in the range of 14-26 degrees, and a peak search by the local maximum method in which the number of points is 20 is applied thereto.

Diffraction intensities from which the base line has been subtracted are plotted against 2θ in the range of 15-25 degrees, and the plot is subjected to a peak search by the local maximum method in which the number of points is 20 and the threshold value is 20% (any maximum having an intensity less than 20% of the highest intensity value is not regarded as a peak).

With respect to each of the samples shown in the experiment items, the 2θ positions of all the peaks in the 2θ range of 15-25 degrees obtained by the search, the intensities thereof obtained through base line subtraction, and the peak intensity ratios (I/M) are summarized in Table 2.

Example 1

1. Granulated Montmorillonite

As an ion-exchanged phyllosilicate, use was made of "Benclay KK", manufactured by Mizusawa Industrial Chemicals, Ltd., which was a granulated montmorillonite product (main component: smectite-group montmorillonite of 2:1 type layered structure).

This granulated montmorillonite had an average particle diameter of 12.9 μm and had a chemical composition (wt %) including Al=9.81, Si=31.52, Fe=1.89, Mg=3.17, Na=2.9, K=0.25, and Ca=0.43. Molar ratios were Al/Si=0.324, Mg/Si=0.116, Fe/Si=0.03, and Mg/Al=0.359. The specific surface area thereof was 81 m$^2$/g. The main metal cations which constituted the octahedral sheets were aluminum. Furthermore, the Si(s)/Si(t) of this ion-exchange phyllosilicate was 0.93.

The montmorillonite which had not been granulated was used to prepare a 0.5 wt % aqueous slurry thereof, and this slurry-state montmorillonite had a particle diameter of 0.44 μm. The method used for preparing the aqueous slurry and the method used for examining the slurry are as shown in (3-2) above.

2. Chemical Treatment of the Ion-Exchange Phyllosilicate

Distilled water was introduced in an amount of 258 g into a 0.5-L flask equipped with a stirrer and a reflux device, and 33.1 g of 96% sulfuric acid was dropped thereinto. The contents were heated with an oil bath until the internal temperature reached 95° C. After the target temperature had been reached, 40.2 g of the granulated montmorillonite shown in 1 above was added, and the resultant mixture was stirred.

Thereafter, the mixture was reacted for 360 minutes while maintaining 95° C. This reaction solution was poured into 0.2 L of distilled water to thereby terminate the reaction. Furthermore, this slurry was filtered with a device configured of a Nutsche funnel, a suction bottle, and an aspirator connected thereto, and the montmorillonite was then rinsed with 0.7 L of distilled water three times.

The thus-treated montmorillonite had a composition (wt %) including Al=7.54, Si=37.29, Mg=2.03, and Fe=1.09, and the contents of Na, K, and Ca therein were detection limits or less. The treated montmorillonite had molar ratios of Al/Si=0.211 and Mg/Al=0.299. The Al content therein after the treatment with sulfuric acid was lower by 34.9% (due to elution) than the Al content before the treatment with sulfuric acid. The treated montmorillonite had a specific surface area of 387 m$^2$/g, the volume of pores with a diameter of 2-10 nm, PV$_{2\text{-}10\ nm}$, was 0.28 cc/g, and the volume of mesopores, PV, was 0.39 cc/g. Hence, the volume of pores with a diameter of 2-10 nm, PV$_{2\text{-}10\ nm}$, was 71.8% of the total volume of mesopores PV.

The cake recovered was dried at 120° C. overnight, and a 28.3-g portion thereof was weighed out and subjected to the next step. This montmorillonite was added to an aqueous solution prepared by dissolving 12.2 g of lithium sulfate hydrate in 172 mL of distilled water in a 1-L plastic beaker, and reacted therewith at 90° C. for 2 hours. The resultant slurry was filtered with a device configured of a Nutsche funnel, a suction bottle, and an aspirator connected thereto, and the montmorillonite was then rinsed with 0.5 L of distilled water three times. The cake recovered was dried at 120° C. overnight.

As a result, chemically treated montmorillonite was obtained in an amount of 28.2 g. This chemically treated montmorillonite had an Li content of 0.49 wt % and contained Li between the layers. It was thus ascertained that the montmorillonite, although having undergone treatments with an acid and a salt, retained the ion-exchange properties.

The specific surface area, the volume of pores with a diameter of 2-10 nm, and the total volume of mesopores did not change through the treatment with lithium sulfate hydrate. The chemically treated montmorillonite obtained here was examined by the nitrogen adsorption method to obtain an adsorption isotherm, which was subjected to the BJH analysis. The mesopore distribution thus determined is shown in FIG. 1.

The chemically treated montmorillonite thus obtained was screened with a sieve having an opening size of 53 µm to remove coarse particles. As a result, 26.9 g of particles having an average particle diameter of 13.4 µm were obtained as the fraction which had passed through the sieve. The specific surface area, the volume of pores with a diameter of 2-10 nm, and the total volume of mesopores did not change through the sieving.

This ion-exchanged phyllosilicate was analyzed by XRD. As a result, two peaks were detected in the 2θ range of 15-25 degrees. The results thereof are summarized in Table 2.

3. Catalyst Preparation

The following procedure was conducted in an inert gas using a solvent and a monomer which each had been deoxidized and dehydrated.

The chemically treated montmorillonite prepared above was introduced into a flask having a capacity of 200 mL and vacuum-dried at 200° C. for 3 hours (at least two hours after bumping had ended). Subsequently, a 10-g portion of the dried montmorillonite was weighed out and placed in a flask having a capacity of 1 L, and 65 mL of heptane and 35 mL of a heptane solution of triisobutylaluminum (TiBA) (25.3 mmol; concentration, 143.4 g/L) were added thereto. This mixture was stirred at room temperature for 1 hour. Thereafter, the solid was rinsed with heptane to a degree of liquid retention of 1/100. Finally, the slurry amount was adjusted to 100 mL. Thereto were added 85 mL of heptane and 1.53 mL of a heptane solution of tri-n-octylaluminum (TnOA) (concentration, 143.6 mg/mL; 599 µmol). This mixture was stirred at room temperature for 15 minutes.

Thereto was added a heptane solution (30 mL) of 125 mg (153.8 µmol) of (r)-[1,1'-dimethylsilylenebis{2-methyl-4-(4-chlorophenyl)-4H-azulenyl}]hafnium dichloride (synthesized in accordance with the Example of JP-A-10-110136), the heptane solution having been prepared in another flask (capacity, 200 mL). This mixture was stirred at 60° C. for 60 minutes. After completion of the reaction, heptane was further added to adjust the total volume to 333 mL.

The montmorillonite/metallocene complex prepared above was introduced into a stirring type autoclave which had a capacity of 1 L and had undergone nitrogen displacement. At the time when the temperature inside the autoclave had become stable at 40° C., propylene began to be fed at a rate of 5 g/hr and the temperature was kept at 40° C. After 4 hours, the feeding of propylene was terminated, and the system was maintained for further 1 hour. Thus, preliminary polymerization was conducted.

After completion of the preliminary polymerization, the residual propylene was removed by purging, and a catalyst slurry which had undergone the preliminary polymerization was recovered from the autoclave. The recovered catalyst slurry which had undergone preliminary polymerization was allowed to stand, and 150 mL of the supernatant was taken out. Subsequently, 4.14 mL of a heptane solution of TiBA (2.96 mmol) was added thereto at room temperature, and the mixture was then vacuum-dried at 40° C. for 1 hour. Thus, 31.79 g of a catalyst which had undergone preliminary polymerization was obtained, the catalyst having included 2.14 g of polypropylene per g of the catalyst.

4. Copolymerization of Propylene and Ethylene

The atmosphere within a stirring type autoclave having a capacity of 3 L was sufficiently displaced with propylene. Thereafter, 2.8 mL (2.02 mmol) of a heptane solution of TiBA was introduced thereinto, followed by 16.5 g of ethylene, 45 mL of hydrogen, and 750 mL of liquid propylene. The contents were heated to 70° C., and this temperature was maintained. The catalyst which had undergo preliminary polymerization was slurried with heptane, and this slurry was forced into the autoclave in an amount of 15 mg in terms of catalyst amount (excluding the weight of the polymer formed by the preliminary polymerization) to initiate polymerization. While keeping the internal temperature at 70° C., the polymerization was continued for 1 hour. Thereafter, 5 mL of ethanol was added thereto to terminate the polymerization reaction. The residual gas was removed by purging to obtain a polymer. The polymer obtained was dried at 90° C. for 1 hour.

As a result, the polymer was obtained in an amount of 318 g. The catalytic activity was 21,200 g-PP/g-catalyst/hr. The MFR thereof was 0.38 g/10 min. The results obtained are shown in Table 1.

Example 2

1. Polymerization of Propylene

Using 15 mg of the same catalyst which had undergone preliminary polymerization as in Example 1, the same polymerization operation as in Example 1 was conducted, except that ethylene was not used.

As a result, the catalytic activity was 9,000 g-PP/g-catalyst/hr. The MFR was 0.50 g/10 min. The results obtained are shown in Table 1.

Example 3

1. Chemical Treatment of Ion-Exchanged Phyllosilicate

The granulated montmorillonite of Example 1 was subjected to the same treatment with sulfuric acid as in Example 1, except that the reaction with the sulfuric acid was conducted for 420 minutes.

The chemically treated montmorillonite thus obtained had a composition (wt %) including Al=6.82, Si=37.40, Mg=1.87, and Fe=0.98, and the contents of Na, K, and Ca therein were detection limits or less. The treated montmorillonite had molar ratios of Al/Si=0.190 and Mg/Al=0.304. Through the treatment with sulfuric acid, 41.4% of the Al was eluted. The treated montmorillonite had a specific surface area of 430 m$^2$/g, a PV$_{2\text{-}10\ nm}$ of 0.33 cc/g, and a PV of 0.46 cc/g. The PV$_{2\text{-}10\ nm}$ was 71.7% of the PV.

Thereafter, a treatment with lithium sulfate hydrate was conducted in the same manner as in Example 1. The specific surface area and the pore distribution remained unchanged after the treatment with lithium sulfate hydrate.

This ion-exchanged phyllosilicate was analyzed by XRD. As a result, two peaks were detected in the 2θ range of 15-25 degrees. The results thereof are summarized in Table 2.

In the subsequent catalyst preparation, screening with a sieve having an opening size of 53 µm was conducted to remove coarse particles and the fraction which had passed through the sieve was used, as in Example 1.

2. Catalyst Preparation

The same procedure as in Example 1 was conducted, except that the chemically treated montmorillonite prepared above was used in an amount of 10 g and that the amount of (r)-[1,1'-dimethylsilylenebis {2-methyl-4-(4-chlorophenyl)-4H-azulenyl}]hafnium dichloride was changed to 126 mg (155 μmol). As a result, a catalyst which had undergone preliminary polymerization and which included 2.07 g of polypropylene per g of the catalyst was obtained in an amount of 31.09 g.

3. Copolymerization of Propylene and Ethylene

The same procedure as in Example 1 was conducted, except that the catalyst shown above was used.

As a result, the catalytic activity was 20,800 g-PP/g-catalyst/hr. The MFR was 0.24 g/10 min. The results obtained are shown in Table 1.

Example 4

1. Chemical Treatment of Ion-Exchanged Phyllosilicate

The granulated montmorillonite of Example 1 was subjected to the same treatment with sulfuric acid as in Example 1, except that the reaction with the sulfuric acid was conducted for 480 minutes.

The chemically treated montmorillonite thus obtained had a composition (wt %) including Al=6.51, Si=37.40, Mg=1.83, and Fe=0.92, and the contents of Na, K, and Ca therein were detection limits or less. The treated montmorillonite had molar ratios of Al/Si=0.181 and Mg/Al=0.312. Through the treatment with sulfuric acid, 44.1% of the Al was eluted. The treated montmorillonite had a specific surface area of 425 m$^2$/g, a $PV_{2\text{-}10\ nm}$ of 0.35 cc/g, and a PV of 0.47 cc/g. The $PV_{2\text{-}10\ nm}$ was 74.5% of the PV.

Thereafter, a treatment with lithium sulfate hydrate was conducted in the same manner as in Example 1. The specific surface area and the pore distribution remained unchanged after the treatment with lithium sulfate hydrate.

This ion-exchanged phyllosilicate was analyzed by XRD. As a result, two peaks were detected in the 2θ range of 15-25 degrees. The results thereof are summarized in Table 2.

In the subsequent catalyst preparation, screening with a sieve having an opening size of 53 μm was conducted to remove coarse particles and the fraction which had passed through the sieve was used, as in Example 1.

2. Catalyst Preparation

The same procedure as in Example 1 was conducted, except that the chemically treated montmorillonite prepared above was used in an amount of 10 g and that the amount of (r)-[1,1'-dimethylsilylenebis {2-methyl-4-(4-chlorophenyl)-4H-azulenyl}]hafnium dichloride was changed to 123 mg (151.3 μmol).

As a result, a catalyst which had undergone preliminary polymerization and which included 2.13 g of polypropylene per g of the catalyst was obtained in an amount of 31.68 g.

3. Copolymerization of Propylene and Ethylene

The same procedure as in Example 1 was conducted, except that the catalyst shown above was used.

As a result, the catalytic activity was 19,500 g-PP/g-catalyst/hr. The MFR was 0.37 g/10 min. The results obtained are shown in Table 1.

Example 5

1. Chemical Treatment of Ion-Exchanged Phyllosilicate

The granulated montmorillonite of Example 1 was subjected to the same treatment with sulfuric acid as in Example 1, except that the reaction with the sulfuric acid was conducted for 220 minutes.

The chemically treated montmorillonite thus obtained had a composition (wt %) including Al=8.10, Si=35.69, Mg=2.34, and Fe=1.20, and the contents of Na, K, and Ca therein were detection limits or less. The treated montmorillonite had molar ratios of Al/Si=0.236 and Mg/Al=0.321. Through the treatment with sulfuric acid, 27.2% of the Al was eluted. The treated montmorillonite had a specific surface area of 350 m$^2$/g, a $PV_{2\text{-}10\ nm}$ of 0.23 cc/g, and a PV of 0.36 cc/g. The $PV_{2\text{-}10\ nm}$ was 63.9% of the PV.

Thereafter, a treatment with lithium sulfate hydrate was conducted in the same manner as in Example 1. The specific surface area and the pore distribution remained unchanged after the treatment with lithium sulfate hydrate.

This ion-exchanged phyllosilicate was analyzed by XRD. As a result, two peaks were detected in the 2θ range of 15-25 degrees. The results thereof are summarized in Table 2.

In the subsequent catalyst preparation, screening with a sieve having an opening size of 53 μm was conducted to remove coarse particles and the fraction which had passed through the sieve was used, as in Example 1.

2. Catalyst Preparation

The same procedure as in Example 1 was conducted, except that the chemically treated montmorillonite prepared above was used in an amount of 10 g and that the amount of (r)-[1,1'-dimethylsilylenebis{2-methyl-4-(4-chlorophenyl)-4H-azulenyl}]hafnium dichloride was changed to 120 mg (147.6 μmol).

As a result, a catalyst which had undergone preliminary polymerization and which included 1.92 g of polypropylene per g of the catalyst was obtained in an amount of 29.55 g.

3. Copolymerization of Propylene and Ethylene

The same procedure as in Example 1 was conducted, except that the catalyst shown above was used.

As a result, the catalytic activity was 21,000 g-PP/g-catalyst/hr. The MFR was 0.40 g/10 min. The results obtained are shown in Table 1.

Comparative Example 1

1. Granulated Montmorillonite

As an ion-exchanged phyllosilicate, use was made of "Benclay SL", manufactured by Mizusawa Industrial Chemicals, Ltd., which was a granulated montmorillonite product (main component: smectite-group montmorillonite of 2:1 type layered structure).

This granulated montmorillonite had an average particle diameter of 14.4 μm and had a composition (wt %) including Al=8.83, Si=33.07, Fe=2.11, Mg=2.12, Na=2.38, K=0.23, and Ca=0.80. Molar ratios were Al/Si=0.278 and Mg/Al=0.266. The specific surface area thereof was 113 m$^2$/g. The main metal cations which constituted the octahedral sheets were aluminum. Furthermore, the Si(s)/Si(t) of this ion-exchanged phyllosilicate was 0.70.

The montmorillonite which had not been granulated was used to prepare a 0.5 wt % aqueous slurry thereof, and this slurry-state montmorillonite had a particle diameter of 0.53 μm. The method used for preparing the aqueous slurry and the method used for examining the slurry are as shown in (3-2) above.

2. Chemical Treatment of the Ion-Exchanged Phyllosilicate

The granulated montmorillonite was subjected to the same treatment with sulfuric acid as in Example 1, except that the reaction was conducted at a temperature of 100° C. for 240 minutes.

The chemically treated montmorillonite thus obtained had a composition (wt %) including Al=6.91, Si=37.99, Mg=1.04, and Fe=1.52, and the contents of Na, K, and Ca therein were detection limits or less. The treated montmorillonite had molar ratios of Al/Si=0.189 and Mg/Al=0.167. Through the treatment with sulfuric acid, 32.0% of the Al was eluted. The acid-treated ion-exchanged phyllosilicate had a specific surface area of 313 m$^2$/g, a $PV_{2\text{-}10\ nm}$ of 0.23 cc/g, and a PV of 0.39 cc/g. The $PV_{2\text{-}10\ nm}$ was 59% of the PV. This acid-treated ion-exchanged phyllosilicate was examined by the nitrogen adsorption/desorption method to obtain an adsorption isotherm, which was subjected to the BJH analysis. The mesopore distribution thus determined is shown in FIG. 2.

Thereafter, a treatment with lithium sulfate hydrate was conducted in the same manner as in Example 1. The specific surface area and the pore distribution remained unchanged after the treatment with lithium sulfate hydrate.

This ion-exchanged phyllosilicate was analyzed by XRD. As a result, two peaks were detected in the 2θ range of 15-25 degrees. The results thereof are summarized in Table 2.

In the subsequent catalyst preparation, screening with a sieve having an opening size of 53 µm was conducted to remove coarse particles and the fraction which had passed through the sieve was used, as in Example 1.

3. Catalyst Preparation

The same procedure as in Example 1 was conducted, except that the chemically treated montmorillonite prepared above was used in an amount of 10 g and that the amount of (r)-[1,1'-dimethylsilylenebis{2-methyl-4-(4-chlorophenyl)-4H-azulenyl}]hafnium dichloride was changed to 123 mg (151.3 µmol). As a result, a catalyst which had undergone preliminary polymerization and which included 2.12 g of polypropylene per g of the catalyst was obtained in an amount of 31.58 g.

4. Copolymerization of Propylene and Ethylene

The same procedure as in Example 1 was conducted, except that the catalyst shown above was used.

As a result, the catalytic activity was 18,000 g-PP/g-catalyst/hr. The MFR was 0.37 g/10 min. The results obtained are shown in Table 1.

Comparative Example 2

1. Polymerization of Propylene

Using 15 mg of the same catalyst which had undergone preliminary polymerization as in Comparative Example 1, the same polymerization operation as in Comparative Example 1 was conducted, except that ethylene was not used.

As a result, the catalytic activity was 7,500 g-PP/g-catalyst/hr. The MFR was 0.80 g/10 min. The results obtained are shown in Table 1.

Comparative Example 3

1. Chemical Treatment of Ion-Exchanged Phyllosilicate

The same granulated montmorillonite as in Comparative Example 1 was subjected to the same treatment with sulfuric acid as in Comparative Example 1, except that the reaction with the sulfuric acid was conducted at 95° C. for 380 minutes.

The chemically treated montmorillonite thus obtained had a composition (wt %) including Al=6.25, Si=39.15, Mg=1.01, and Fe=1.47, and the contents of Na, K, and Ca therein were detection limits or less. The treated montmorillonite had molar ratios of Al/Si=0.166 and Mg/Al=0.179. Through the treatment with sulfuric acid, 40.3% of the Al was eluted. The acid-treated ion-exchanged phyllosilicate had a specific surface area of 290 m$^2$/g, a $PV_{2\text{-}10\ nm}$ of 0.23 cc/g, and a PV of 0.42 cc/g. The $PV_{2\text{-}10\ nm}$ was 54.8% of the PV.

Thereafter, a treatment with lithium sulfate hydrate was conducted in the same manner as in Example 1. The specific surface area and the pore distribution remained unchanged after the treatment with lithium sulfate hydrate.

This ion-exchanged phyllosilicate was analyzed by XRD. As a result, two peaks were detected in the 2θ range of 15-25 degrees. The results thereof are summarized in Table 2.

In the subsequent catalyst preparation, screening with a sieve having an opening size of 53 µm was conducted to remove coarse particles and the fraction which had passed through the sieve was used, as in Example 1.

2. Catalyst Preparation

The same procedure as in Example 1 was conducted, except that the chemically treated montmorillonite prepared above was used in an amount of 10 g and that the amount of (r)-[1,1'-dimethylsilylenebis{2-methyl-4-(4-chlorophenyl)-4H-azulenyl}]hafnium dichloride was changed to 123 mg (151.3 µmol).

As a result, a catalyst which had undergone preliminary polymerization and which included 2.13 g of polypropylene per g of the catalyst was obtained in an amount of 31.68 g.

3. Copolymerization of Propylene and Ethylene

The same procedure as in Example 1 was conducted, except that the catalyst shown above was used.

As a result, the catalytic activity was 15,000 g-PP/g-catalyst/hr. The MFR was 0.41 g/10 min. The results obtained are shown in Table 1.

Comparative Example 4

1. Chemical Treatment of Ion-Exchanged Phyllosilicate

The same treatment with sulfuric acid as in Comparative Example 1 was conducted, except that the amounts of distilled water and sulfuric acid were changed to 184.6 g and 16.7 g, respectively, and that the reaction was conducted at 90° C. for 1,200 minutes.

The chemically treated montmorillonite thus obtained had a composition (wt %) including Al=7.18, Si=37.94, Mg=1.09, and Fe=1.53, and the contents of Na, K, and Ca therein were detection limits or less. The treated montmorillonite had molar ratios of Al/Si=0.197 and Mg/Al=0.168. Through the treatment with sulfuric acid, 29.1% of the Al was eluted. The acid-treated ion-exchanged phyllosilicate had a specific surface area of 301 m$^2$/g, a $PV_{2\text{-}10\ nm}$ of 0.22 cc/g, and a PV of 0.38 cc/g. The $PV_{2\text{-}10\ nm}$ was 57.9% of the PV.

Thereafter, a treatment with lithium sulfate hydrate was conducted in the same manner as in Example 1. The specific surface area and the pore distribution remained unchanged after the treatment with lithium sulfate hydrate.

This ion-exchanged phyllosilicate was analyzed by XRD. As a result, two peaks were detected in the 2θ range of 15-25 degrees. The results thereof are summarized in Table 2.

In the subsequent catalyst preparation, screening with a sieve having an opening size of 53 µm was conducted to remove coarse particles and the fraction which had passed through the sieve was used, as in Example 1.

2. Catalyst Preparation

The same procedure as in Example 1 was conducted, except that the chemically treated montmorillonite prepared above was used in an amount of 10.2 g and that the amount of (r)-[1,1'-dimethylsilylenebis{2-methyl-4-(4-chlorophenyl)-4H-azulenyl}]hafnium dichloride was changed to 122 mg (150.2 µmol).

As a result, a catalyst which had undergone preliminary polymerization and which included 2.19 g of polypropylene per g of the catalyst was obtained in an amount of 32.93 g.

3. Copolymerization of Propylene and Ethylene

The same procedure as in Example 1 was conducted, except that the catalyst shown above was used.

As a result, the catalytic activity was 17,600 g-PP/g-catalyst/hr. The MFR was 0.42 g/10 min. The results obtained are shown in Table 1.

Comparative Example 5

1. Chemical Treatment of Ion-Exchanged Phyllosilicate

The same sulfuric acid treatment and salt treatment as in Comparative Example 1 were conducted, except that 660 g of distilled water, 67 g of magnesium sulfate heptahydrate, and 55 g of sulfuric acid were introduced, that the granulated montmorillonite used in Comparative Example 1 was treated in an amount of 100 g, and that the reaction was conducted at a temperature of 90° C. for 1,230 minutes. The subsequent salt treatment with lithium sulfate was omitted.

The chemically treated montmorillonite thus obtained had a composition (wt %) including Al=6.50, Si=34.50, Mg=1.60, and Fe=1.43, and the contents of Na, K, and Ca therein were detection limits or less. The treated montmorillonite had molar ratios of Al/Si=0.196 and Mg/A=0.273. Through the sulfuric acid treatment and the salt treatment, 29.4% of the Al was eluted. The acid- and salt-treated ion-exchange phyllosilicate had a specific surface area of 262 m$^2$/g, a $PV_{2\text{-}10\ nm}$ of 0.18 cc/g, and a PV of 0.39 cc/g. The $PV_{2\text{-}10\ nm}$ was 46.2% of the PV.

This ion-exchange phyllosilicate was analyzed by XRD. As a result, two peaks were detected in the 2θ range of 15-25 degrees. The results thereof are summarized in Table 2.

In the subsequent catalyst preparation, screening with a sieve having an opening size of 53 μm was conducted to remove coarse particles and the fraction which had passed through the sieve was used, as in Example 1.

2. Catalyst Preparation

The same procedure as in Example 1 was conducted, except that the chemically treated montmorillonite prepared above was used in an amount of 10 g and that the amount of (r)-[1,1'-dimethylsilylenebis{2-methyl-4-(4-chlorophenyl)-4H-azulenyl}]hafnium dichloride was changed to 123 mg (151.3 μmol).

As a result, a catalyst which had undergone preliminary polymerization and which included 0.50 g of polypropylene per g of the catalyst was obtained in an amount of 15.15 g.

3. Copolymerization of Propylene and Ethylene

The same procedure as in Example 1 was conducted, except that the catalyst shown above was used.

As a result, the catalytic activity was 14,000 g-PP/g-catalyst/hr. The MFR was 0.42 g/10 min. The results obtained are shown in Table 1.

Comparative Example 6

1. Chemical Treatment of Ion-Exchanged Phyllosilicate

The same treatment with sulfuric acid as in Comparative Example 1 was conducted, except that 3,750 g of distilled water and 2,500 g of sulfuric acid were introduced, that the granulated montmorillonite used in Comparative Example 1 was treated in an amount of 1,000 g, and that the mixture was heated to a reaction temperature of 90° C. over 60 minutes, reacted at 90° C. for 300 minutes, and then cooled over 60 minutes.

The chemically treated montmorillonite thus obtained had a composition (wt %) including Al=5.21, Si=38.92, Mg=0.80, and Fe=1.25, and the contents of Na, K, and Ca therein were detection limits or less. The treated montmorillonite had molar ratios of Al/Si=0.139 and Mg/Al=0.170. Through the treatment with sulfuric acid, 50.0% of the Al was eluted. The acid-treated ion-exchanged phyllosilicate had a specific surface area of 222 m$^2$/g, a $PV_{2\text{-}10\ nm}$ of 0.21 cc/g, and a PV of 0.39 cc/g. The $PV_{2\text{-}10\ nm}$ was 53.8% of the PV.

Thereafter, a treatment with lithium sulfate hydrate was conducted in the same manner as in Example 1. The specific surface area and the pore distribution remained unchanged after the lithium treatment.

This ion-exchanged phyllosilicate was analyzed by XRD. As a result, two peaks were detected in the 2θ range of 15-25 degrees. The results thereof are summarized in Table 2.

In the subsequent catalyst preparation, screening with a sieve having an opening size of 53 μm was conducted to remove coarse particles and the fraction which had passed through the sieve was used, as in Example 1. The ion-exchanged phyllosilicate was examined by the nitrogen adsorption method to obtain an adsorption isotherm, which was subjected to the BJH analysis. The mesopore distribution thus determined is shown in FIG. 3.

2. Catalyst Preparation

The same procedure as in Example 1 was conducted, except that the chemically treated montmorillonite prepared above was used in an amount of 10 g and that the amount of (r)-[1,1'-dimethylsilylenebis{2-methyl-4-(4-chlorophenyl)-4H-azulenyl}]hafnium dichloride was changed to 122 mg (150.1 μmol).

As a result, a catalyst which had undergone preliminary polymerization and which included 2.18 g of polypropylene per g of the catalyst was obtained in an amount of 32.14 g.

3. Copolymerization of Propylene and Ethylene

The same procedure as in Example 1 was conducted, except that the catalyst shown above was used.

As a result, the catalytic activity was 10,500 g-PP/g-catalyst/hr. The MFR was 0.53 g/10 min. The results obtained are shown in Table 1.

TABLE 1

| | Volume of pores having diameter of 2-10 nm ($PV_{2\text{-}10\ nm}$) cc/g | Total volume of mesopores (PV) cc/g | $PV_{2\text{-}10\ nm}$/PV % | Specific surface area m$^2$/g | Amount of Al eliminated % | Activity g/g-cat/hr | MFR g/10 min | Mg/Al mol/mol | Si(s)/Si(t) mol/mol |
|---|---|---|---|---|---|---|---|---|---|
| Example 1 | 0.28 | 0.39 | 71.8 | 387 | 34.0 | 21,200 | 0.38 | 0.299 | 0.77 |
| Example 2 | 0.28 | 0.39 | 71.8 | 387 | 34.0 | 9,000 | 0.50 | 0.299 | 0.77 |
| Example 3 | 0.33 | 0.46 | 71.7 | 430 | 40.5 | 20,800 | 0.24 | 0.305 | 0.70 |
| Example 4 | 0.35 | 0.47 | 74.5 | 425 | 46.4 | 19,500 | 0.37 | 0.312 | 0.67 |
| Example 5 | 0.23 | 0.36 | 63.9 | 350 | 27.1 | 21,000 | 0.40 | 0.321 | 0.89 |

TABLE 1-continued

| | Volume of pores having diameter of 2-10 nm (PV$_{2\text{-}10\ nm}$) cc/g | Total volume of mesopores (PV) cc/g | PV$_{2\text{-}10\ nm}$/ PV % | Specific surface area m$^2$/g | Amount of Al eliminated % | Activity g/g-cat/hr | MFR g/10 min | Mg/Al mol/mol | Si(s)/Si(t) mol/mol |
|---|---|---|---|---|---|---|---|---|---|
| Comparative Example 1 | 0.23 | 0.39 | 59.0 | 313 | 34.5 | 18,000 | 0.37 | 0.167 | 0.58 |
| Comparative Example 2 | 0.23 | 0.39 | 59.0 | 313 | 34.5 | 7,500 | 0.80 | 0.167 | 0.58 |
| Comparative Example 3 | 0.23 | 0.42 | 54.8 | 290 | 41.1 | 15,000 | 0.41 | 0.162 | 0.52 |
| Comparative Example 4 | 0.22 | 0.38 | 57.9 | 301 | 31.8 | 17,600 | 0.42 | 0.169 | 0.60 |
| Comparative Example 5 | 0.18 | 0.39 | 46.2 | 262 | 31.0 | 14,000 | 0.42 | 0.273 | 0.70 |
| Comparative Example 6 | 0.21 | 0.39 | 53.8 | 222 | 50.9 | 10,500 | 0.53 | 0.170 | 0.43 |

TABLE 2

| | | With respect to peaks detected by the local maximum method, with 20 points | | Intensity ratio |
|---|---|---|---|---|
| | | Peak (m) | Peak (i) | (I/M) |
| Examples 1 and 2 | 2θ, degrees | 19.82 | 21.98 | — |
| | Intensity | 292.765 | 177.296 | 0.6056 |
| Example 3 | 2θ, degrees | 19.78 | 21.98 | — |
| | Intensity | 268.036 | 177.592 | 0.6626 |
| Example 4 | 2θ, degrees | 19.8 | 21.94 | — |
| | Intensity | 243.302 | 209.712 | 0.8619 |
| Example 5 | 2θ, degrees | 19.86 | 21.88 | — |
| | Intensity | 317.934 | 163.492 | 0.5142 |
| Comparative Examples 1 and 2 | 2θ, degrees | 19.84 | 21.88 | — |
| | Intensity | 228.703 | 273.224 | 1.195 |
| Comparative Example 3 | 2θ, degrees | 19.82 | 21.94 | — |
| | Intensity | 268.678 | 328.592 | 1.223 |
| Comparative Example 4 | 2θ, degrees | 19.86 | 21.74 | — |
| | Intensity | 241.977 | 284.207 | 1.175 |
| Comparative Example 5 | 2θ, degrees | 19.8 | 21.84 | — |
| | Intensity | 235.885 | 298.549 | 1.266 |
| Comparative Example 6 | 2θ, degrees | 19.78 | 21.82 | — |
| | Intensity | 210.569 | 365.464 | 1.736 |

It can be seen from Table 1 that the catalysts of Examples 1 to 5, in each of which the catalyst component constituted of an ion-exchanged phyllosilicate satisfies the feature wherein the sum of the volumes of pores each having a diameter of 2-10 nm PV$_{2\text{-}10\ nm}$ accounts for 60-100% of the total volume of mesopores PV, have higher catalytic activity than the catalysts of Comparative Examples 1 to 6 which were evaluated under the same conditions and improved conditions.

INDUSTRIAL APPLICABILITY

In cases when the catalyst component for olefin polymerization of the invention, which includes a specific ion-exchanged phyllosilicate, and the catalyst for olefin polymerization which includes the catalyst component are used, the polymerization proceeds with high activity, making it possible to efficiently produce polyolefins. The catalyst component and the catalyst of the invention hence have high industrial applicability.

The invention claimed is:

1. A catalyst component for olefin polymerization, comprising an ion-exchanged phyllosilicate having the following property 1, Property 1: in a pore distribution curve calculated by the BJH analysis method using an adsorption isotherm determined by a nitrogen adsorption method, the sum of the volumes of pores each having a diameter of 2-10 nm accounts for 60-100% of the total volume of mesopores.

2. The catalyst component for olefin polymerization according to claim 1, wherein the ion-exchanged phyllosilicate further has the following property 2, Property 2: in X-ray diffractometry (XRD), the ion-exchanged phyllosilicate gives a diffraction pattern which has a peak (m) at a 2θ of 19.6-20.0 degrees, and when the peak (m) has a peak intensity (M), there is no peak (i) other than the peak (m) in a 2θ of 15-25 degrees, or there is a peak (i) in the 2θ of 15-25 degrees and the peak (i) has a peak intensity (I) that satisfies the relationship with the peak intensity (M): 0<(I/M)≤1.6, with the proviso that there may be multiple peaks (i) and in a case where there are multiple (n) peaks (i), the sum of the ratios of the peak intensity ($I_n$) of the respective n peaks to the peak intensity (M), $I_n$/M, satisfies 0<[sum of ($I_n$/M)]≤1.6.

3. The catalyst component for olefin polymerization according to claim 1, wherein the ion-exchanged phyllosilicate further has the following property 3, Property 3: a specific surface area is 325 m$^2$/g or larger.

4. The catalyst component for olefin polymerization according to claim 1, wherein the ion-exchanged phyllosilicate is a silicate belonging to a smectite group.

5. The catalyst component for olefin polymerization according to claim 1, wherein the ion-exchanged phyllosilicate is montmorillonite.

6. The catalyst component for olefin polymerization according to claim 1, wherein the ion-exchanged phyllosilicate has undergone an acid treatment with an inorganic acid or an organic acid, and 10-65% by mole of main metal cations of the octahedral sheets constituting the ion-exchanged phyllosilicate have been eliminated by the acid treatment.

7. The catalyst component for olefin polymerization according to claim 6, wherein the main metal cations of the octahedral sheets are aluminum.

8. A catalyst for olefin polymerization, comprising the following component (a) and component (b), and optionally comprising the following component (c), Component (a): a metallocene compound of a transition metal belonging to Group 4 of the periodic table, Component (b): the catalyst component for olefin polymerization according to claim 1, and Component (c): an organoaluminum compound.

9. A process for producing an olefin (co)polymer, comprising polymerizing or copolymerizing one or more kinds of olefins using the catalyst for olefin polymerization according to claim 8.

10. The catalyst component for olefin polymerization according to claim 2, wherein the ion-exchanged phyllosilicate further has the following property 3, Property 3: a specific surface area is 325 $m^2/g$ or larger.

* * * * *